Figure 1:
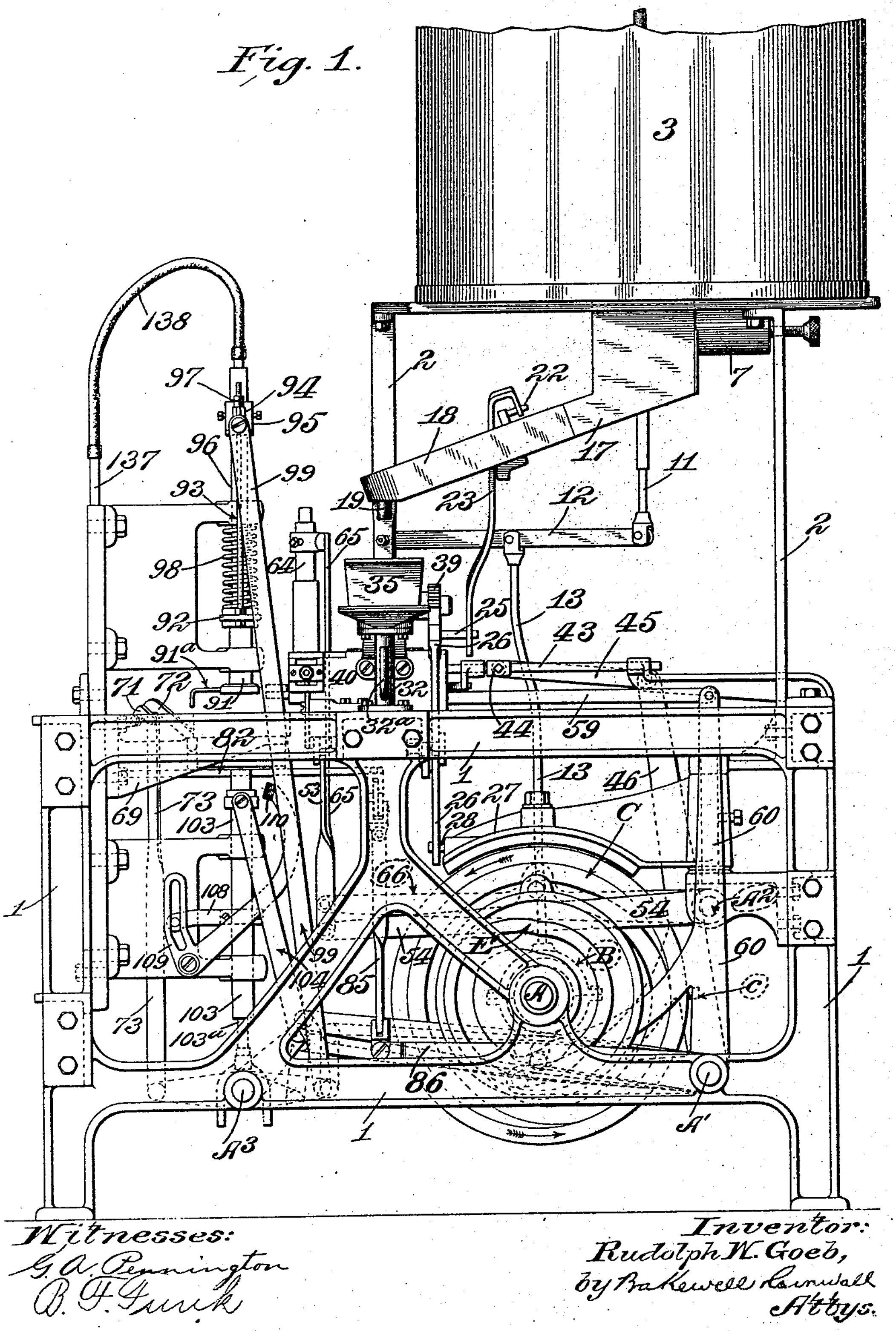

BEST AVAILABLE COPY

No. 801,659.

PATENTED OCT. 10, 1905.

R. W. GOEB.

MACHINE FOR FORMING PULP STOPPERS.

APPLICATION FILED JAN. 19, 1905.

17 SHEETS—SHEET 1.

Witnesses:
G. A. Pennington
B. F. Funk

Inventor:
Rudolph W. Goeb,
by Bakewell & Cornwall
Attys.

ANDREW B. GRAHAM CO. PHOTO-LITHOGRAPHERS, WASHINGTON, D. C.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 2.

Witnesses:
G. A. Pennington
B. F. Funk

Inventor:
Rudolph W. Goeb,
by Bakewell & Cornwall
Attys.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 3.

Witnesses:
G. A. Pennington
B. F. Funk

Inventor:
Rudolph W. Goeb,
by Bakewell & Cornwall
Attys.

ANDREW. B. GRAHAM CO., PHOTO-LITHOGRAPHERS, WASHINGTON, D. C.

BEST AVAILABLE COP'

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 4.

Witnesses:
G. A. Pennington
B. F. Funk

Inventor:
Rudolph W. Goeb,
by Bakewell Cornwall
Attys.

ANDREW B. GRAHAM CO., PHOTO-LITHOGRAPHERS, WASHINGTON, D. C.

BEST AVAILABLE COPY

No. 801,659.

PATENTED OCT. 10, 1905.

R. W. GOEB.

MACHINE FOR FORMING PULP STOPPERS.

APPLICATION FILED JAN. 19, 1905.

17 SHEETS—SHEET 5.

Witnesses:
G. A. Pennington
B. F. Funk

Inventor:
Rudolph W. Goeb,
by Bakewell Cornwall
Attys.

ANDREW B. GRAHAM CO., PHOTO-LITHOGRAPHERS, WASHINGTON, D. C.

BEST AVAILABLE COP'

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 6.

Witnesses:
G. A. Pennington
B. F. Funk

Inventor
Rudolph W. Goeb,
by Bakewell & Cornwall
Att'ys

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 7.

Witnesses:
G. A. Pennington
B. F. Funk

Inventor:
Rudolph W. Goeb,
by Bakewell & Cornwall
Attys.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 8.

Witnesses:
G. A. Pennington
B. F. Funk

Inventor:
Rudolph W. Goeb,
by Bakewell & Cornwall
Attys.

No. 801,659. BEST AVAILABLE COP` PATENTED OCT. 10, 1905.

R. W. GOEB.

MACHINE FOR FORMING PULP STOPPERS.

APPLICATION FILED JAN. 19, 1905.

17 SHEETS—SHEET 9.

Witnesses:
G. A. Pennington
B. F. Funk

Inventor:
Rudolph W. Goeb,
by Bakewell & Cornwall
Attys.

ANDREW. B. GRAHAM CO., PHOTO-LITHOGRAPHERS, WASHINGTON, D. C.

BEST AVAILABLE COP`

No. 801,659. PATENTED OCT. 10, 1905.
R. W. GOEB.
MACHINE FOR FORMING PULP STOPPERS.
APPLICATION FILED JAN. 19, 1905.
17 SHEETS—SHEET 10.

Witnesses:
G. A. Pennington
B. F. Funk

Inventor:
Rudolph W. Goeb,
by Bakewell & Cornwall
Attys.

ANDREW. B. GRAHAM CO., PHOTO-LITHOGRAPHERS, WASHINGTON, D. C.

No. 801,659.

PATENTED OCT. 10, 1905.

R. W. GOEB.

MACHINE FOR FORMING PULP STOPPERS.

APPLICATION FILED JAN. 19, 1905.

17 SHEETS—SHEET 11.

BEST AVAILABLE COPY

Witnesses:
G. A. Pennington
B. F. Funk

Inventor:
Rudolph W. Goeb,
by Bakewell Cornwall
Attys.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 12.

Witnesses:
G. A. Pennington
B. F. Funk

Inventor:
Rudolph W. Goeb,
by Bakewell & Cornwall
Attys.

ANDREW. B. GRAHAM CO., PHOTO-LITHOGRAPHERS, WASHINGTON, D. C.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 13.

Witnesses:
G. A. Pennington
B. F. Funk

Inventor:
Rudolph W. Goeb,
by Bakewell & Cornwall
Attys.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 14.

Witnesses:
G. A. Pennington
B. F. Funk

Inventor:
Rudolph W. Goeb,
by Bakewell & Cornwall
Attys.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 15.

Witnesses:
G. A. Pennington
B. F. Funk

Inventor:
Rudolph W. Goeb,
by Bakewell & Cornwall
Attys.

BEST AVAILABLE COP`

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 16.

Witnesses:
G. A. Pennington
B. F. Funk

Inventor:
Rudolph W. Goeb,
by Bakewell & Cornwall
Attys.

ANDREW. B. GRAHAM CO., PHOTO-LITHOGRAPHERS, WASHINGTON, D. C.

BEST AVAILABLE COPY

No. 801,659. PATENTED OCT. 10, 1905.

R. W. GOEB.

MACHINE FOR FORMING PULP STOPPERS.

APPLICATION FILED JAN. 19, 1905.

17 SHEETS—SHEET 17.

Witnesses:

G. A. Pennington

B. F. Funk

Inventor:

Rudolph W. Goeb, by Bakewell & Cornwall

Attys.

BEST AVAILABLE COPY

UNITED STATES PATENT OFFICE.

RUDOLPH W. GOEB, OF ST. LOUIS, MISSOURI, ASSIGNOR TO UNITED STATES FIBER STOPPER COMPANY, OF ST. LOUIS, MISSOURI, A CORPORATION OF SOUTH DAKOTA.

MACHINE FOR FORMING PULP STOPPERS.

No. 801,659. Specification of Letters Patent. Patented Oct. 10, 1905.

Application filed January 19, 1905. Serial No. 241,865. (Model.)

*To all whom it may concern:*

Be it known that I, RUDOLPH W. GOEB, a citizen of the United States, residing at St. Louis, Missouri, have invented a certain new and useful Improvement in Machines for Forming Pulp Stoppers, of which the following is a full, clear, and exact description, such as will enable others skilled in the art to which it appertains to make and use the same, reference being had to the accompanying drawings, forming part of this specification, in which—

Figures 2, 2A, 2B:
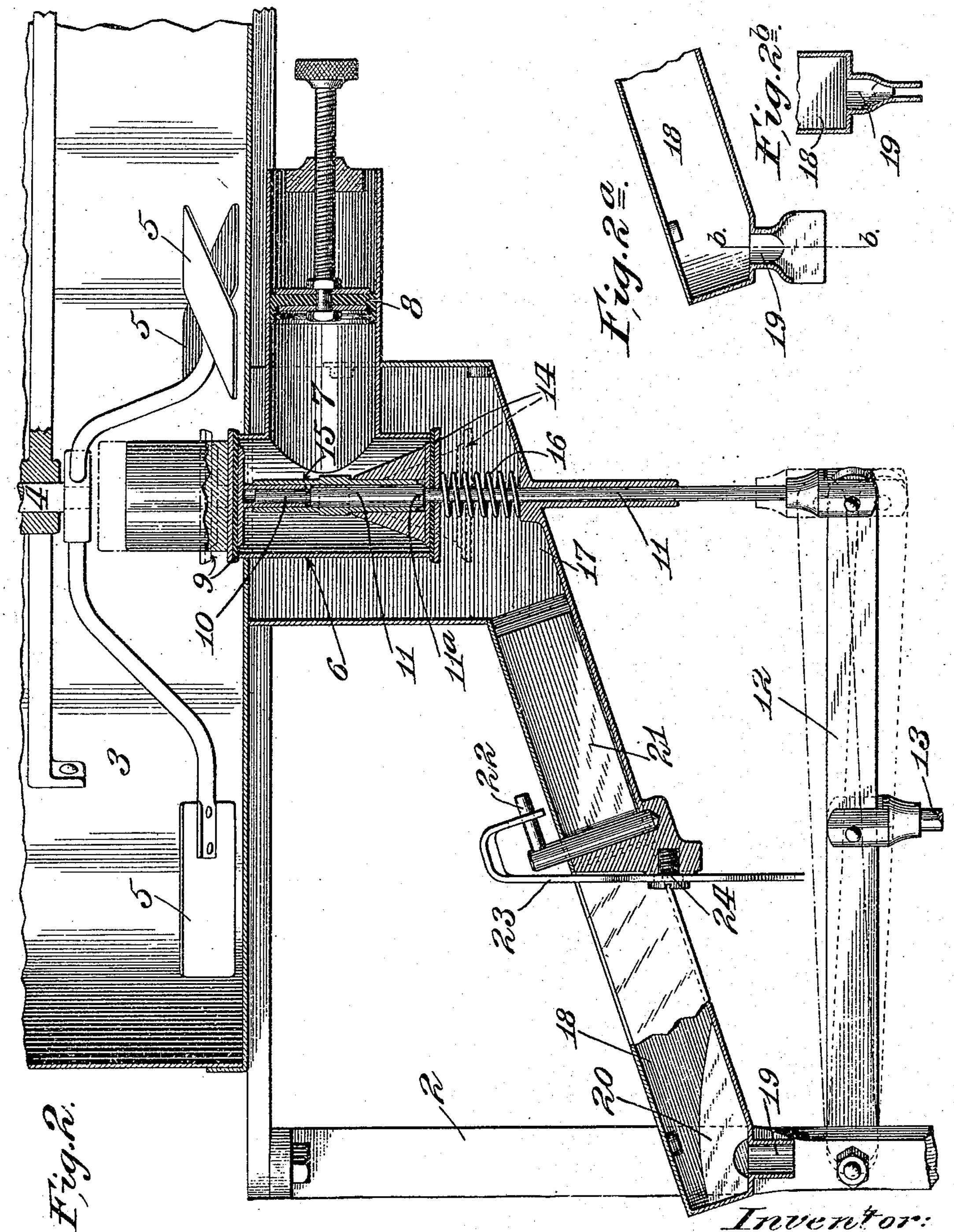
Figure 3:
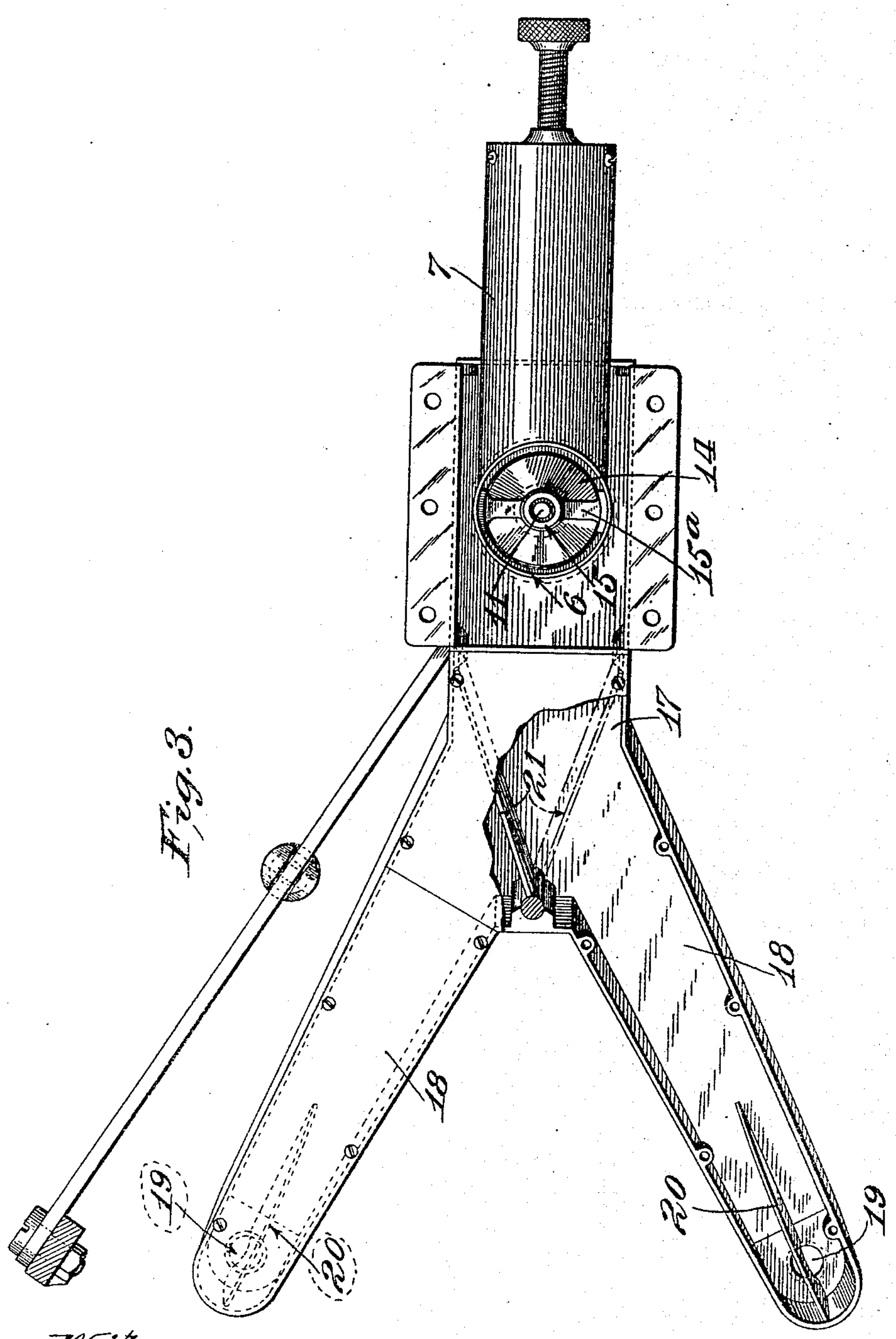
Figure 4:
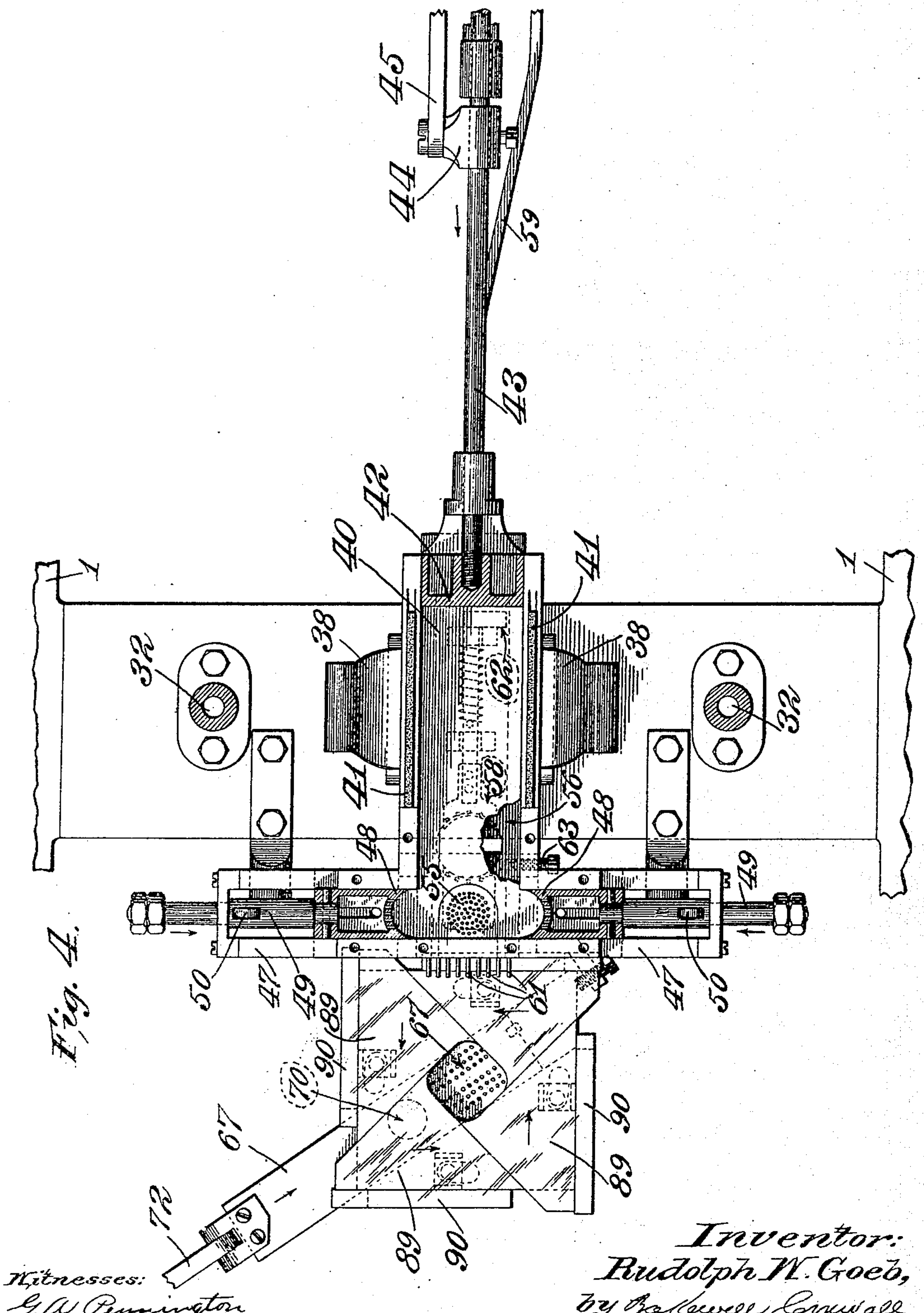
Figures 5, 5A:
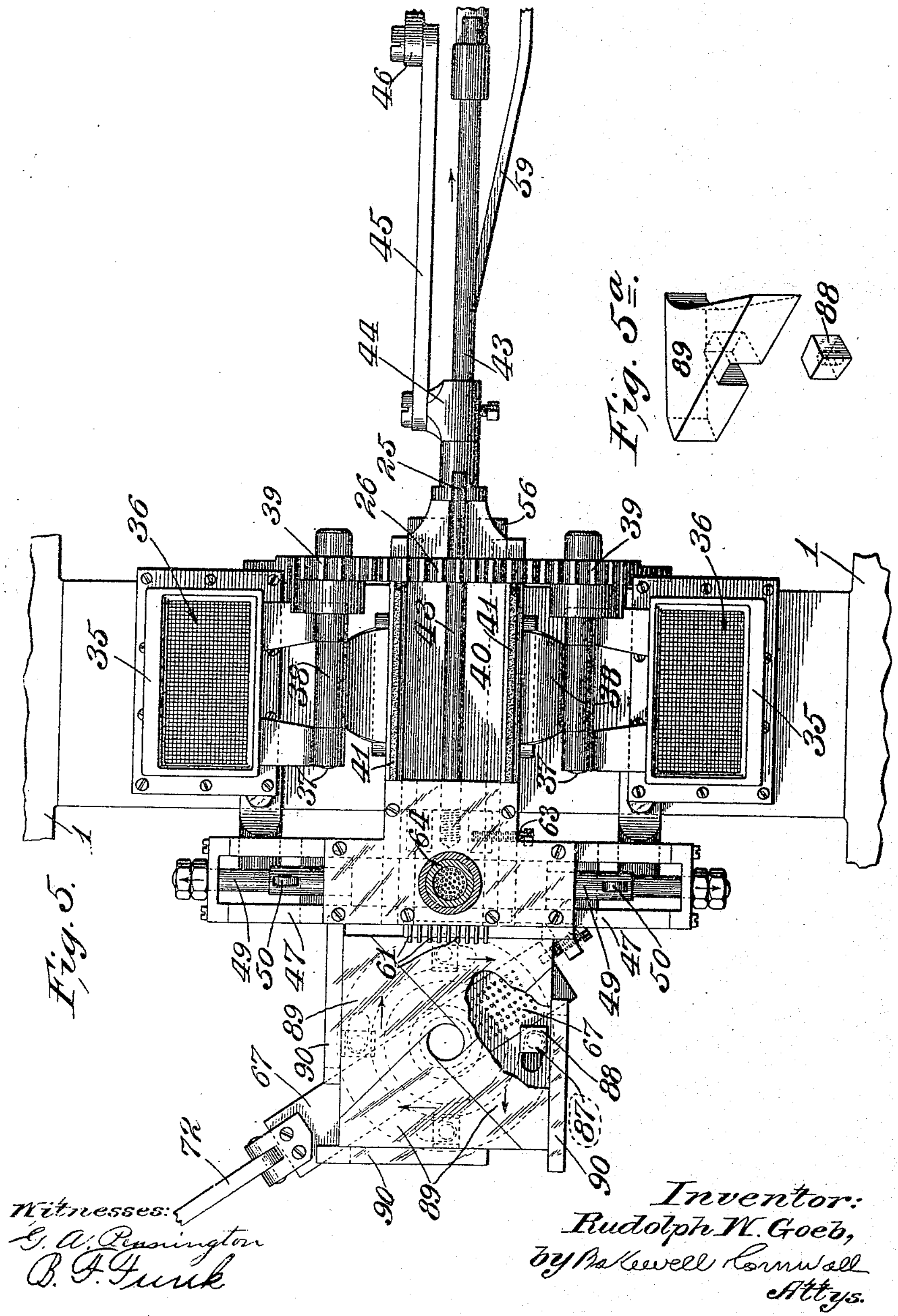
Figure 6:
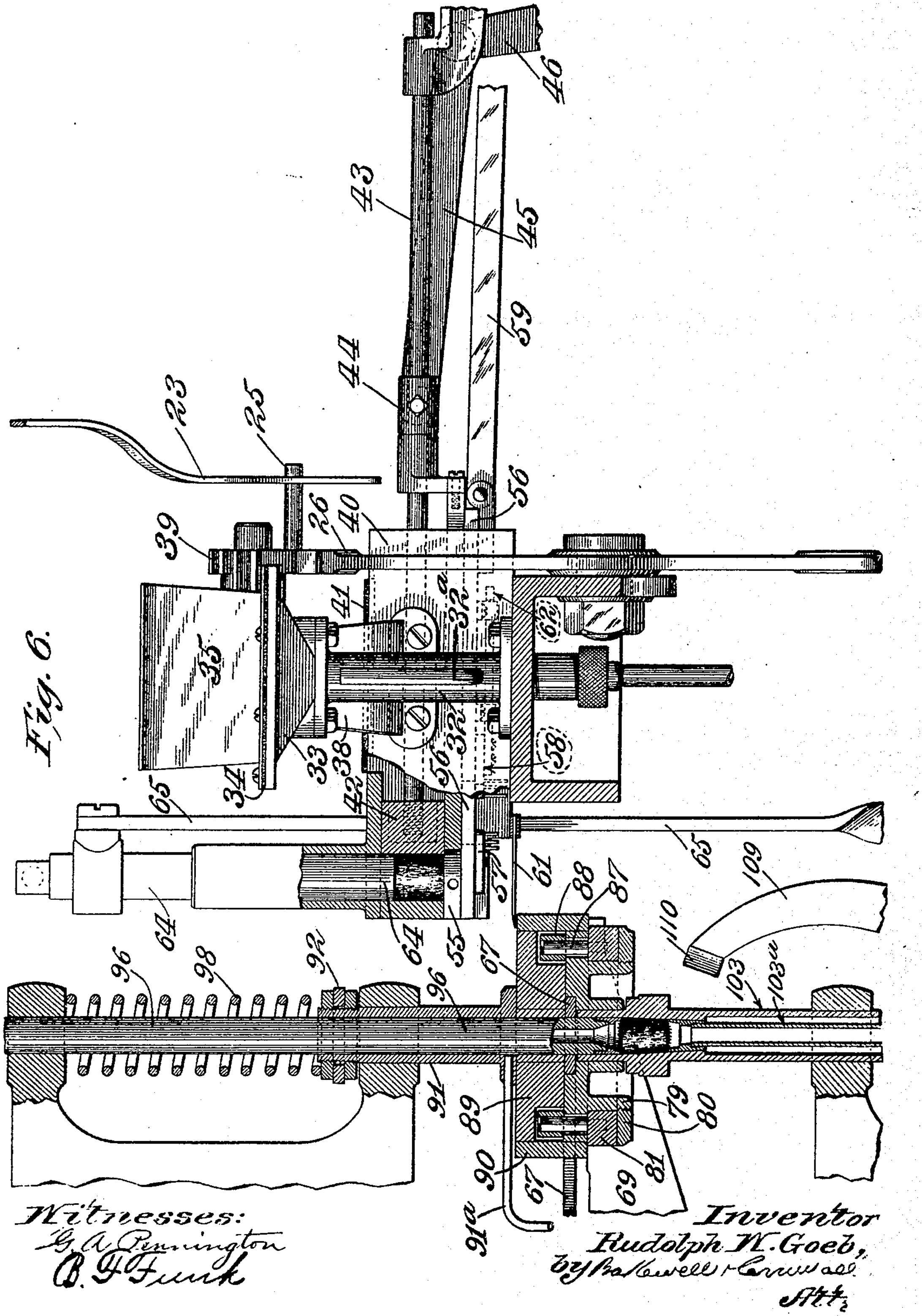
Figure 7:
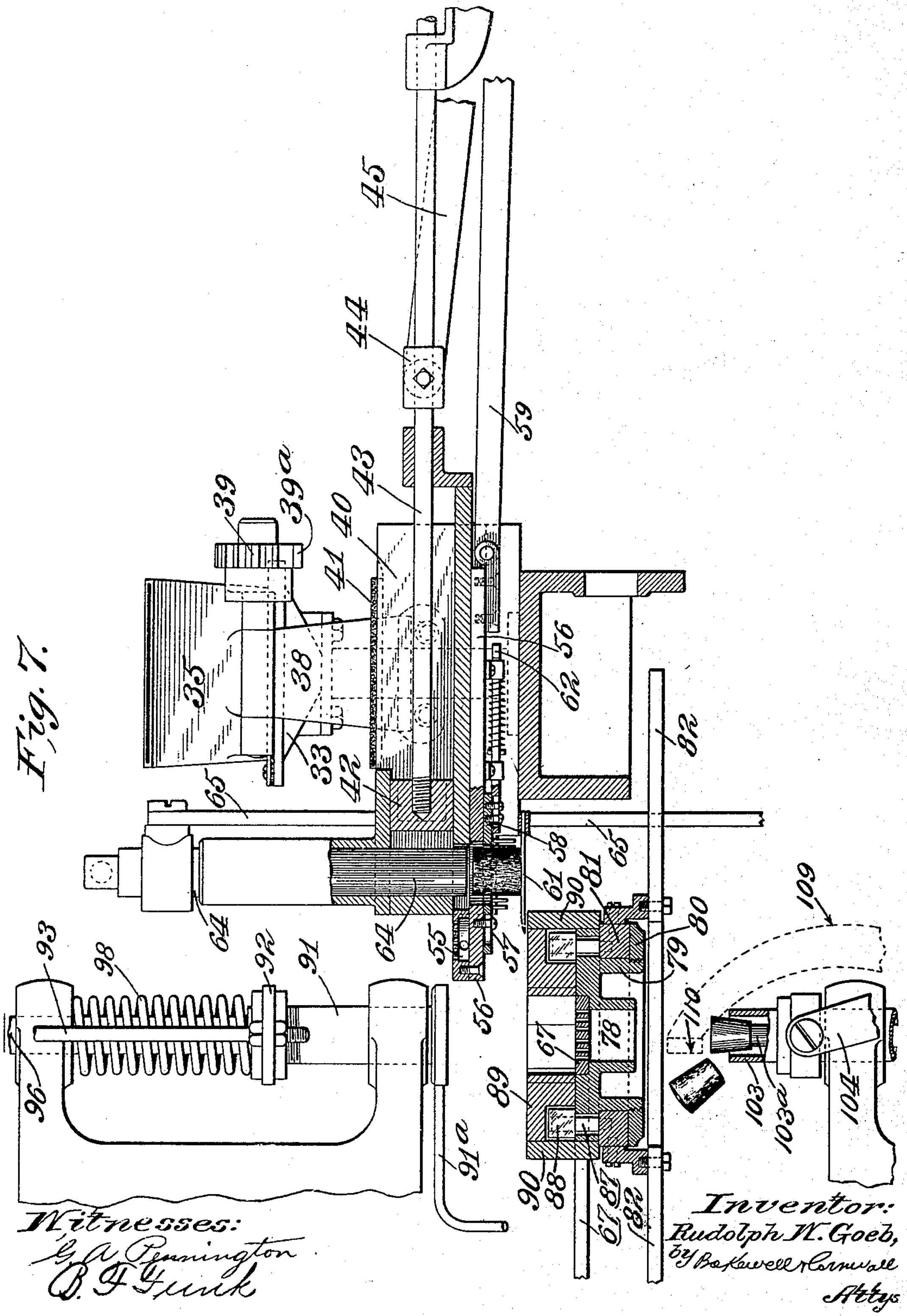
Figure 8:
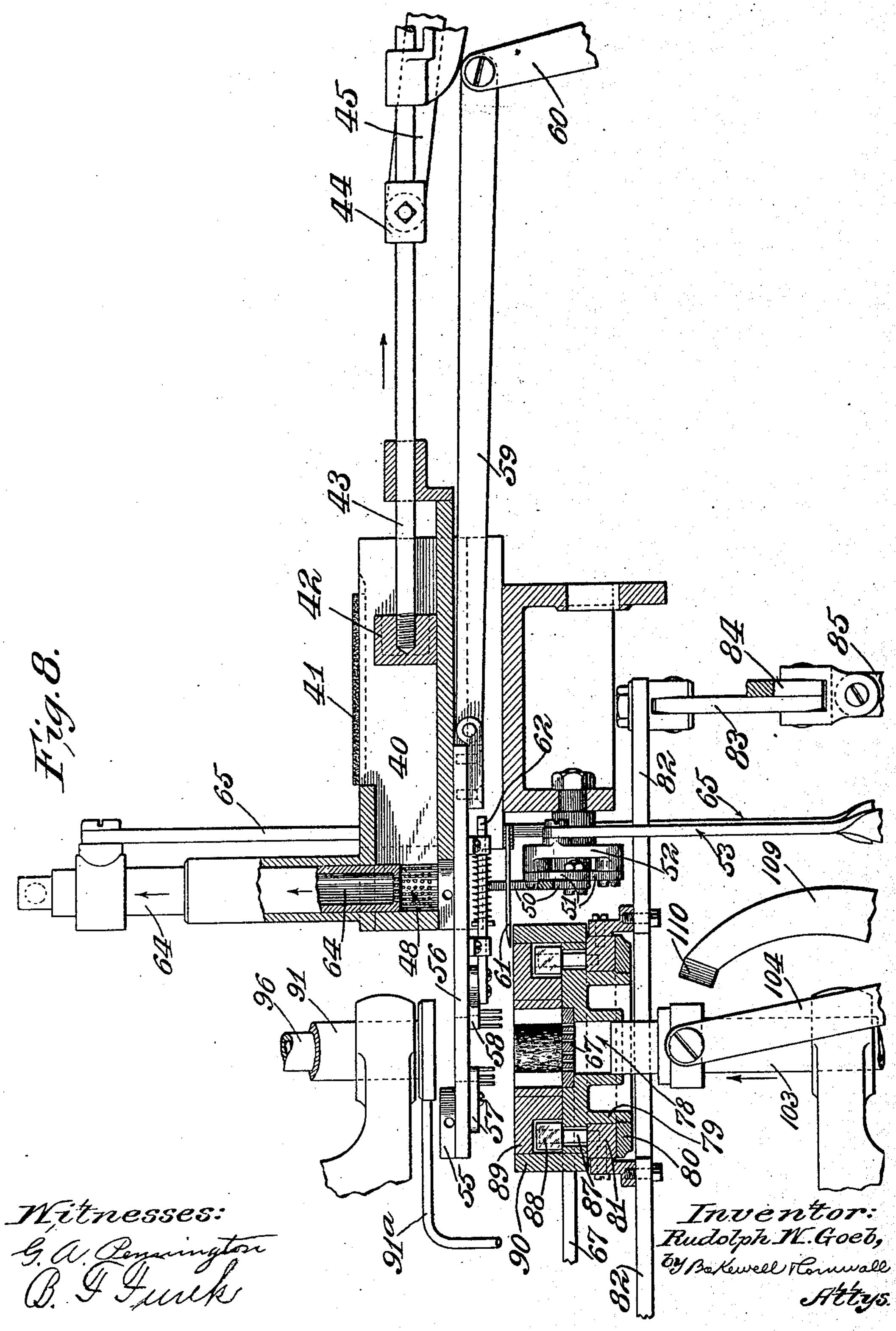
Figure 8A:
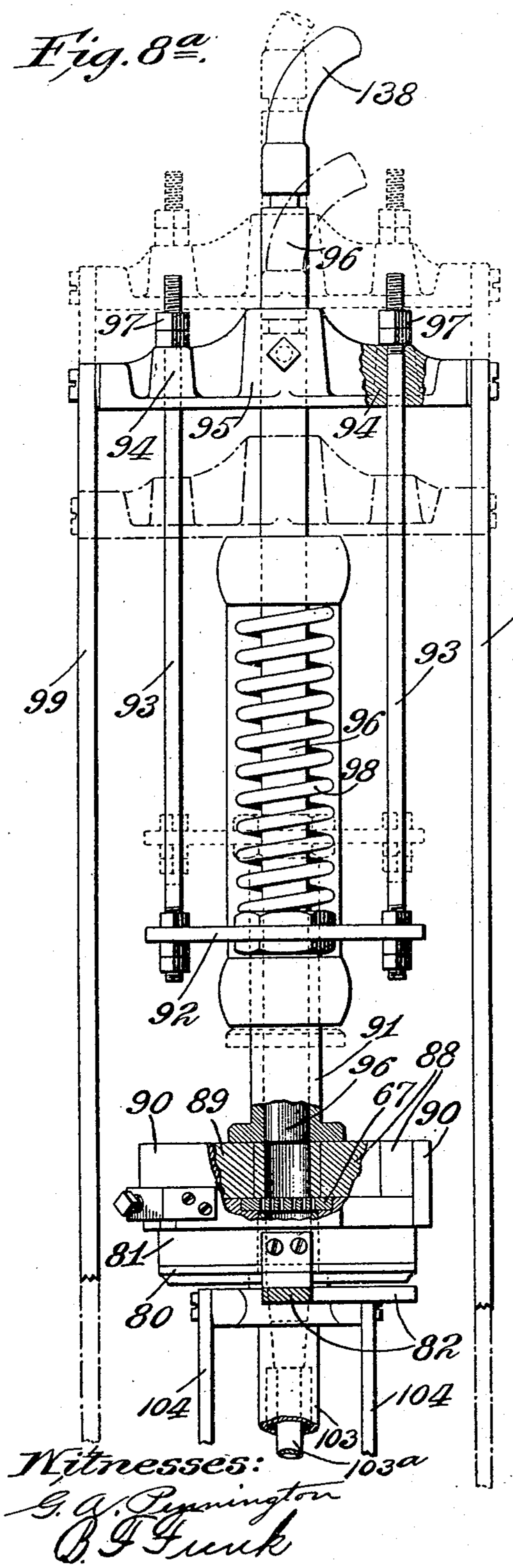
Figure 8B:
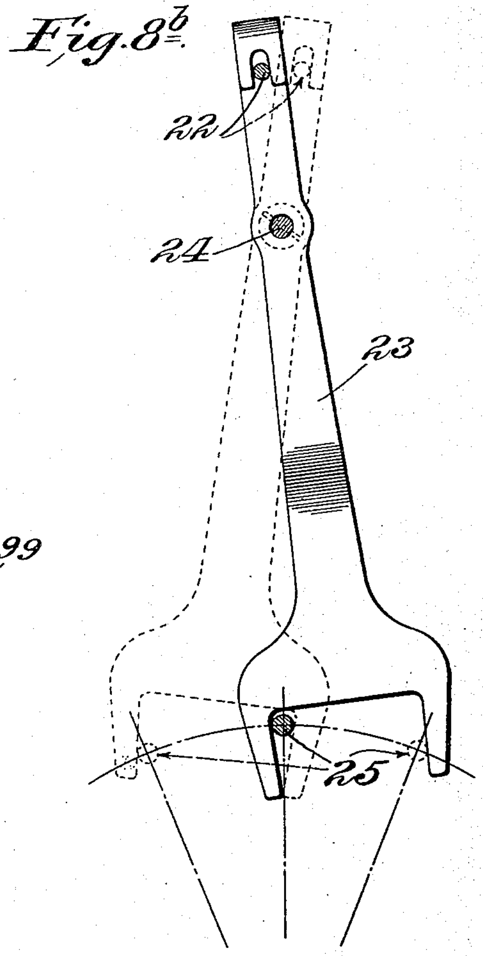
Figure 24:
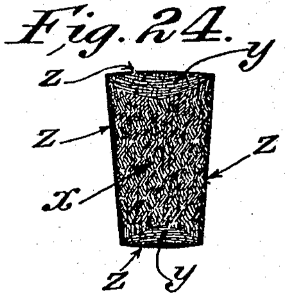
Figure 9:
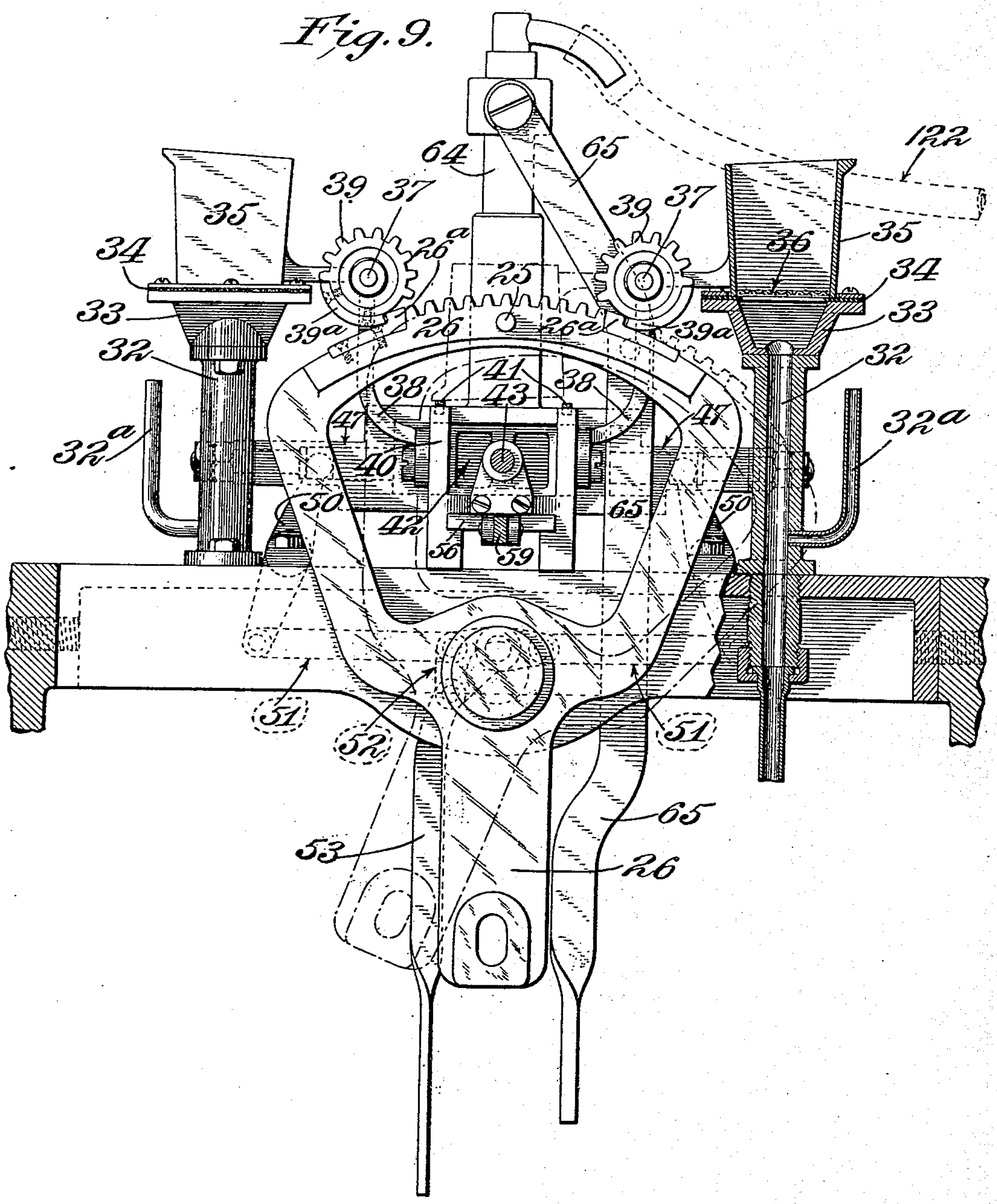
Figures 10, 10A, 10B:
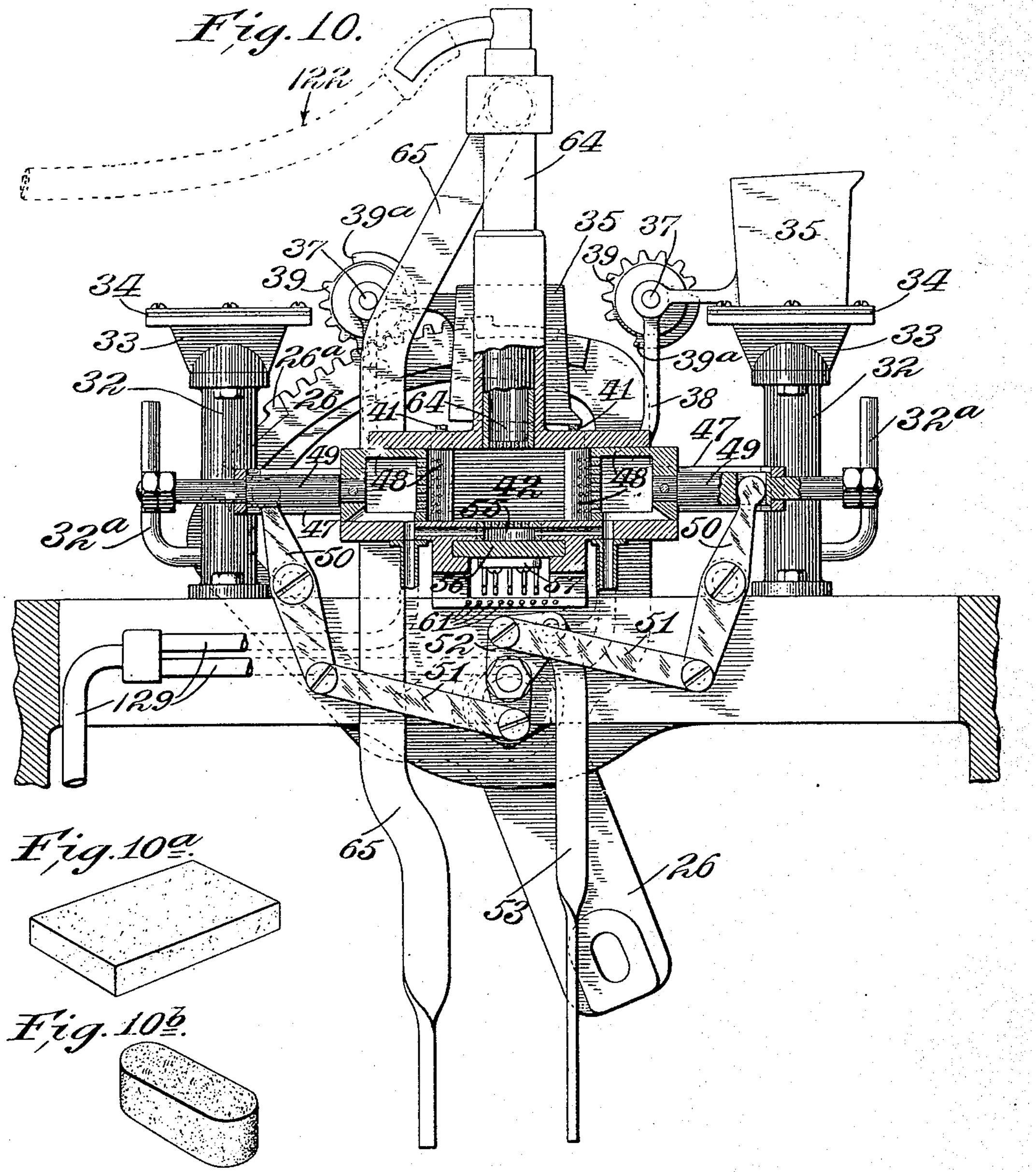
Figures 10C, 10D, 10E, 10F:
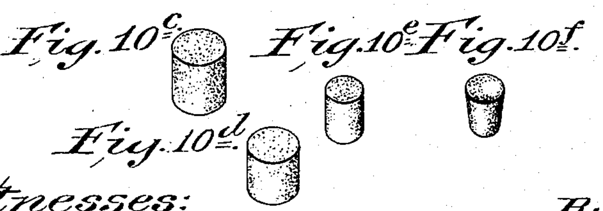
Figure 11:
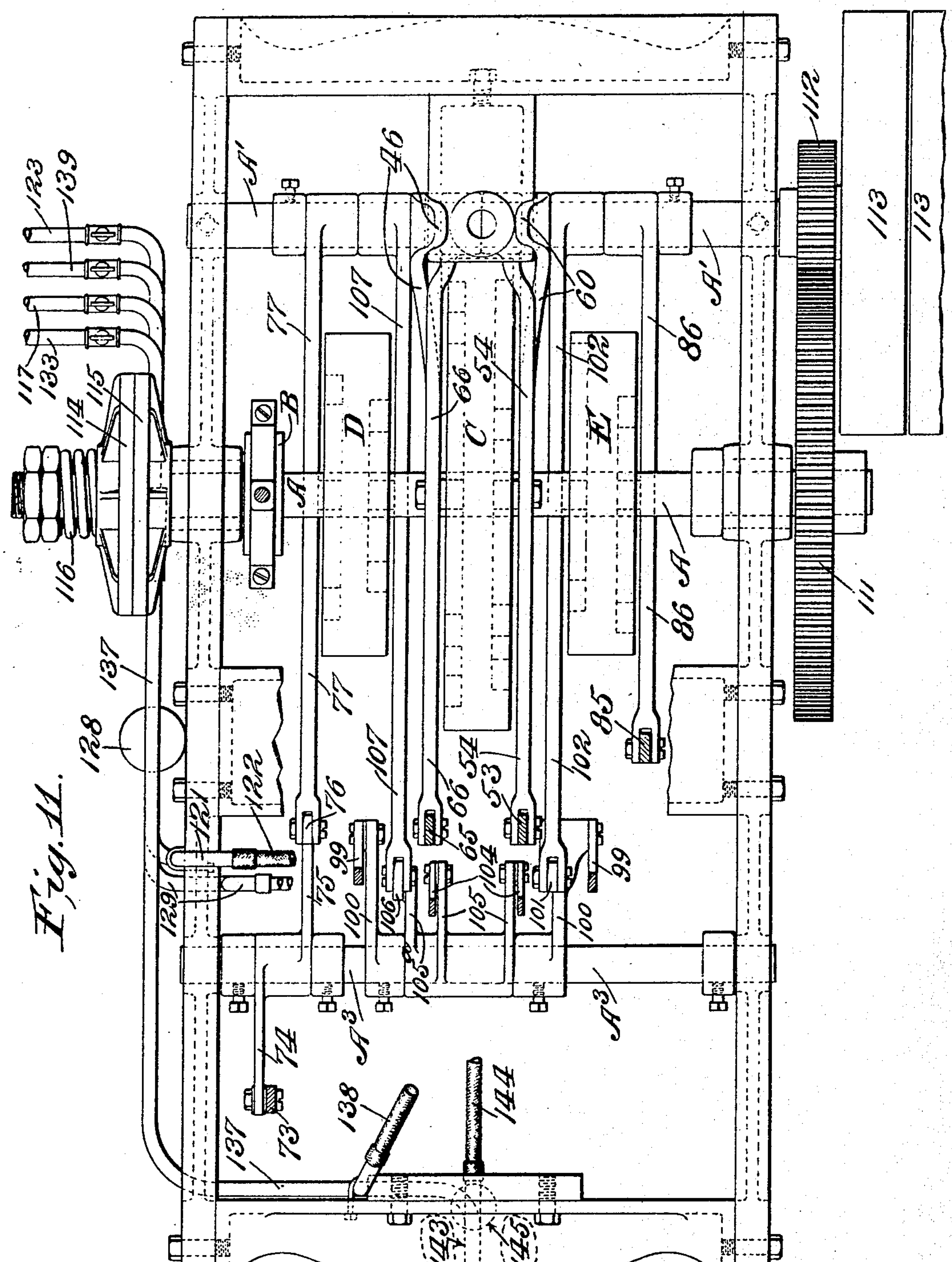
Figures 12, 12A, 12B:
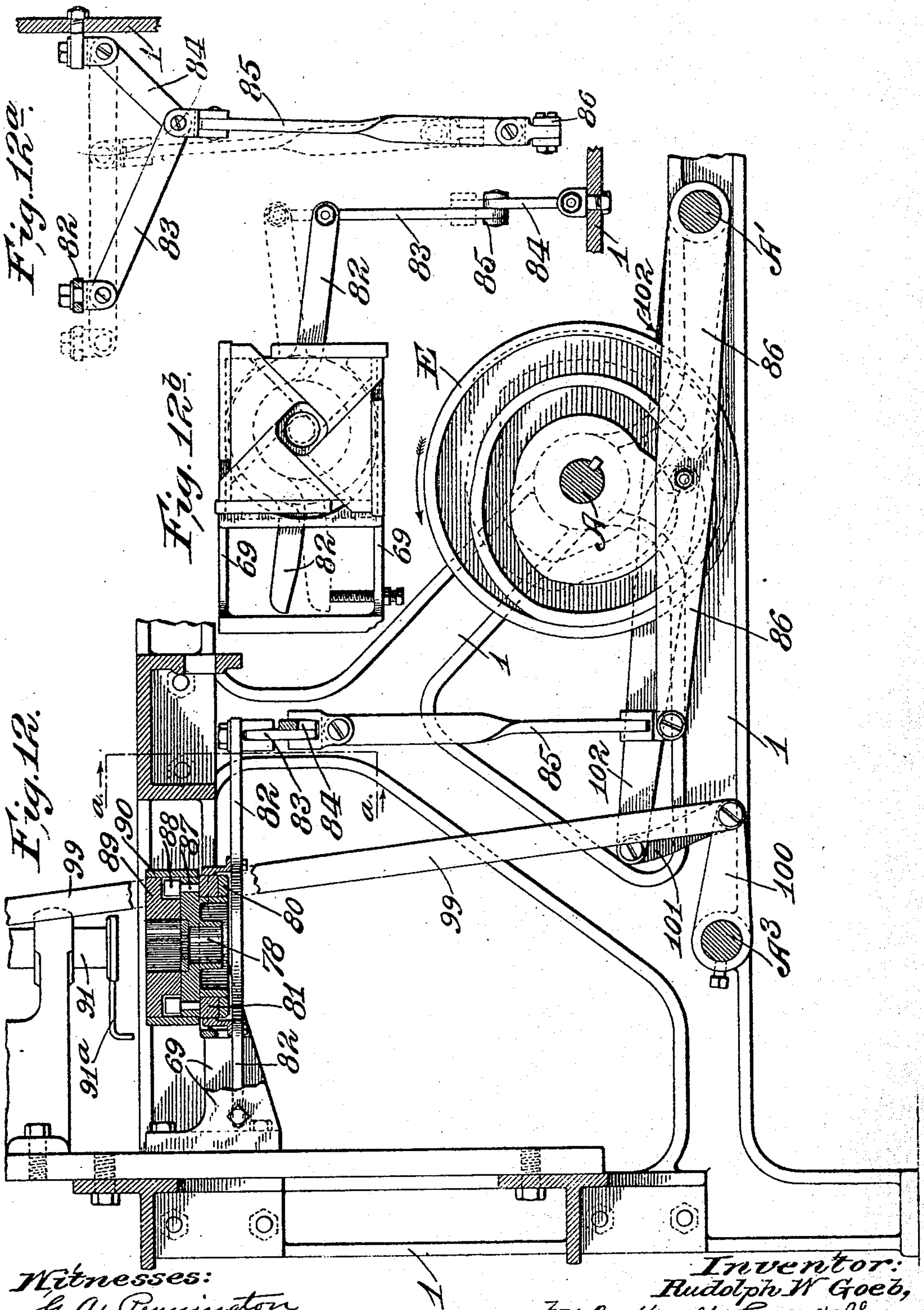
Figures 13, 13A, 13B:
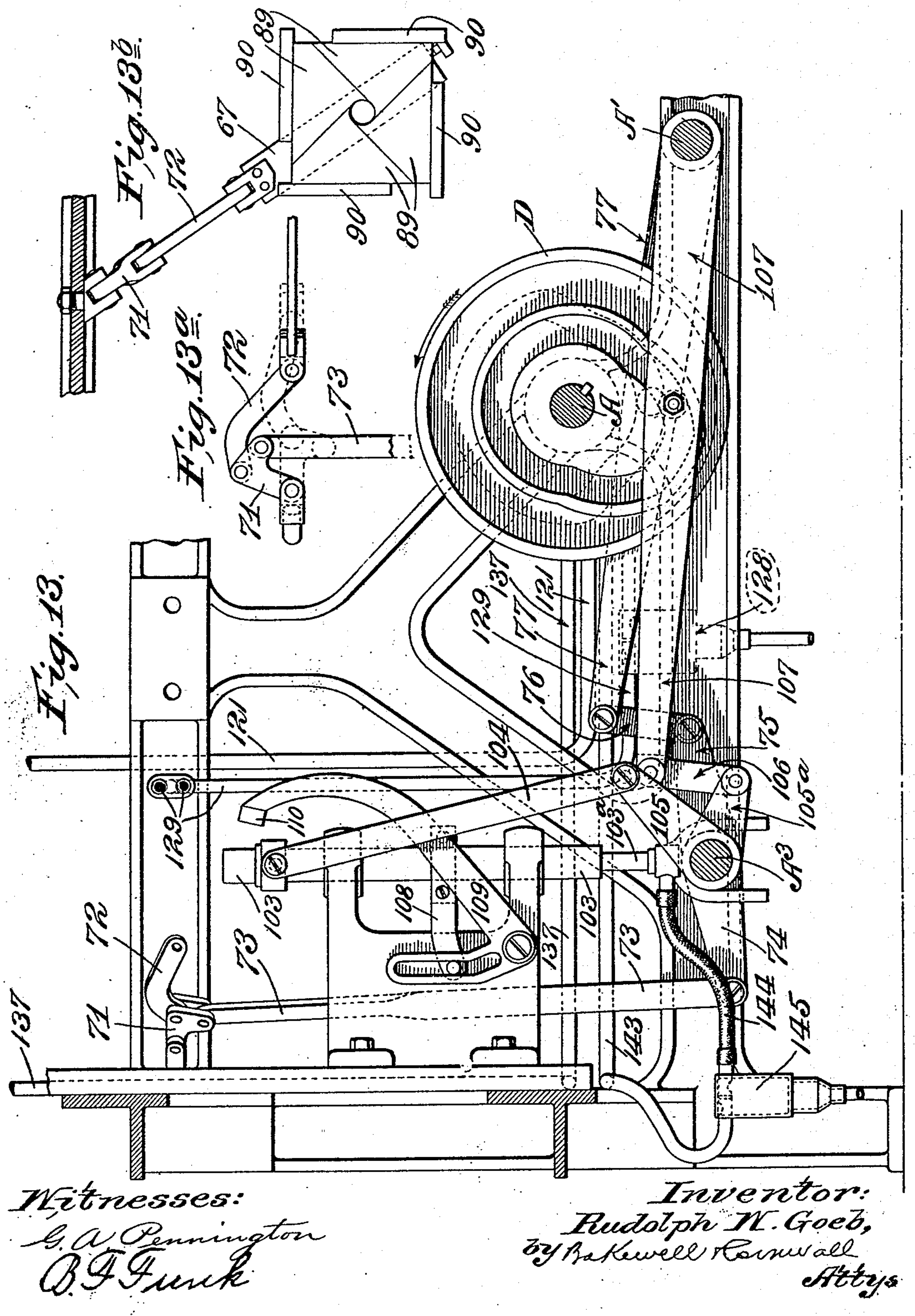
Figures 14, 15, 16:
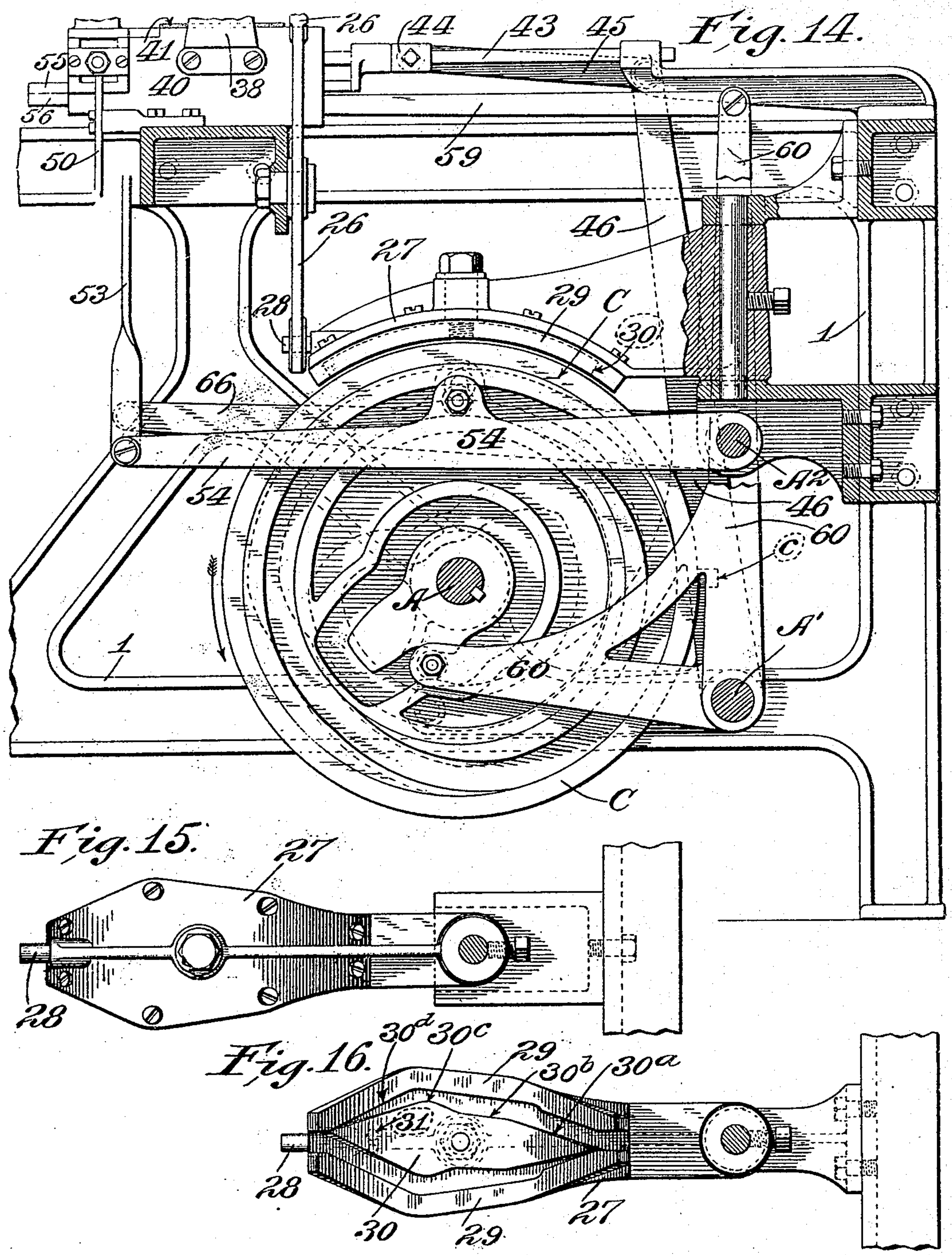
Figures 16A, 16B, 16C, 16D, 16E, 16F, 17:
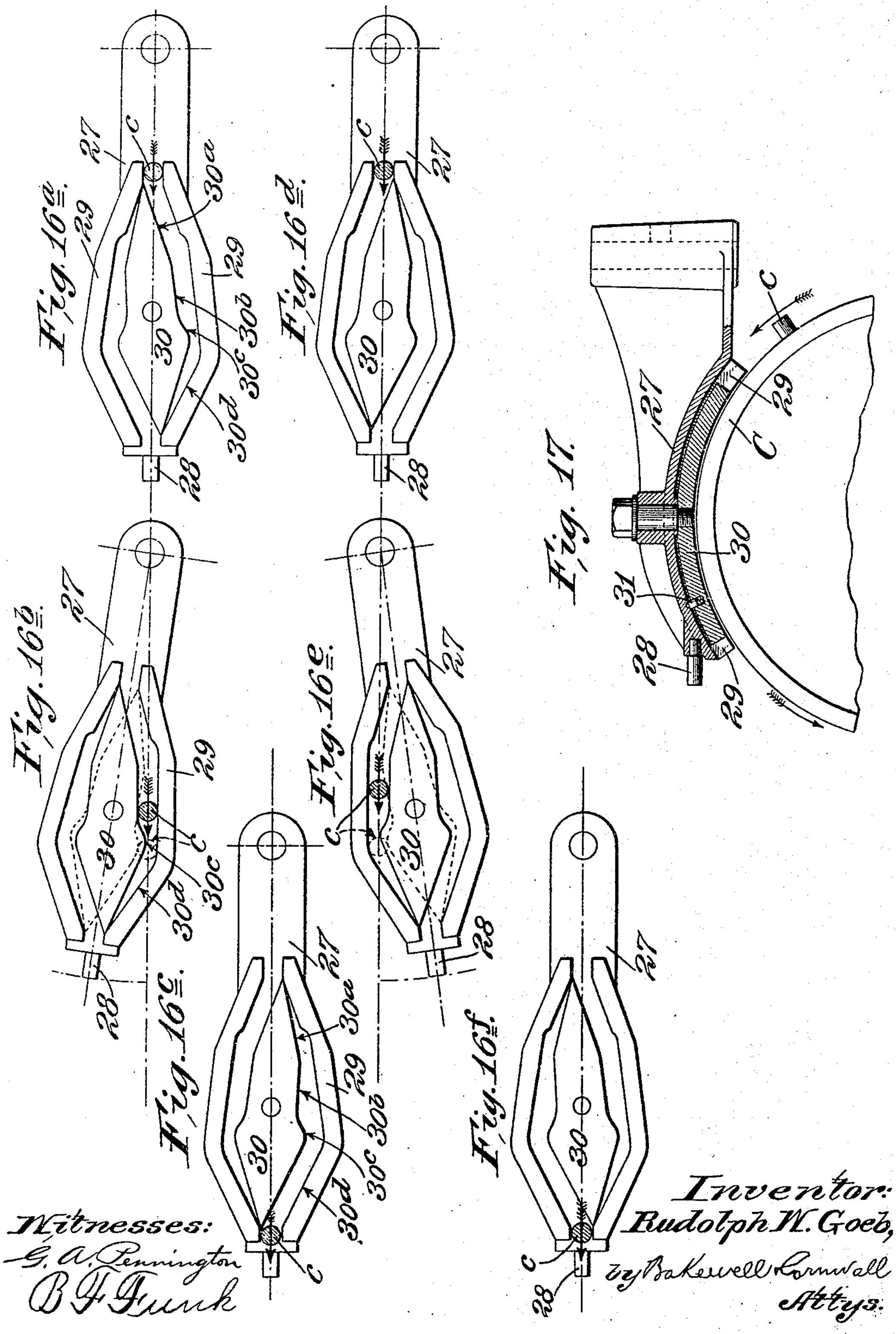
Figures 18, 19, 20, 21, 22, 23:
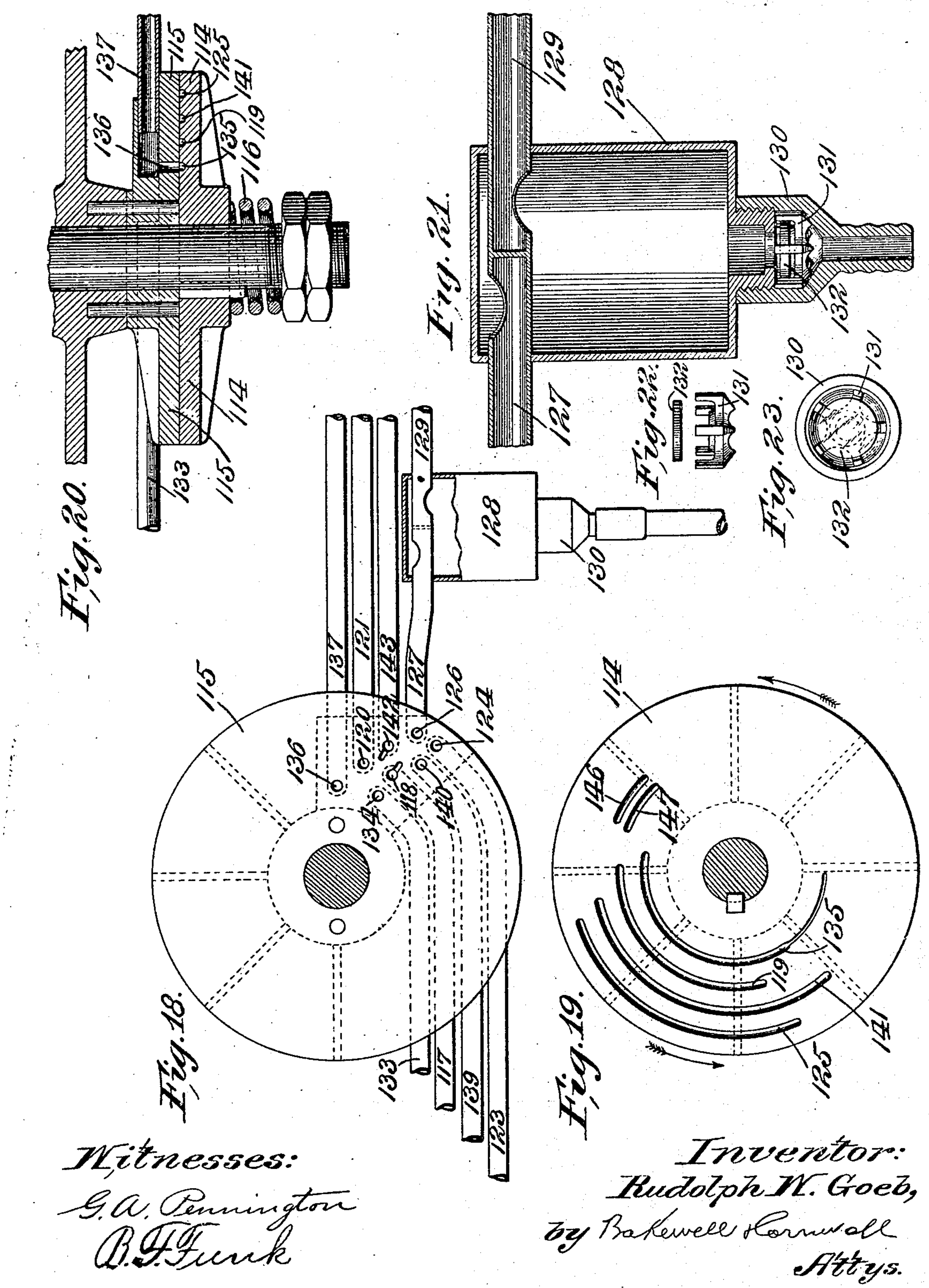

Figure 1 is a side elevational view of my improved machine. Fig. 2 is a vertical sectional view through the pulp-water tank and measuring-valve. Fig. $2^a$ is a detail view showing a modified form of discharge-spout for the pulp-water. Fig. $2^b$ is a sectional view on the line *b b* of Fig. $2^a$. Fig. 3 is a plan view of the measuring-valve and discharge-spouts. Fig. 4 is a top plan view, partly in section, of a stopper-forming mechanism. Fig. 5 is a similar view showing the parts in a different position. Fig. $5^a$ is a detail view of one of the members of the four-part die. Fig. 6 is a vertical sectional view through the forming mechanism when the parts are in the position shown in Fig. 5. Fig. 7 is a similar view showing the parts in a changed position. Fig. 8 is a similar view showing the parts in another position. Fig. $8^a$ is a front elevational view of certain of the parts. Fig. $8^b$ is a detail view of the lever for operating the valve to direct successive discharges of pulp-water into the respective draining-receptacles. Fig. 9 is a rear elevational view of the parts of the forming mechanism shown in Fig. 5. Fig. 10 is a front elevational view, partly in section, of the forming mechanism shown in Fig. 5. Figs. $10^a$, $10^b$, $10^c$, $10^d$, $10^e$, $10^f$ are views illustrating the shape, size, and density of the pulp-water in its different stages to and including its conversion into the finished stopper. Fig. 11 is a plan view of the frame of the machine, showing the different operating or driving parts. Fig. 12 is a side elevational view showing the means for operating the four-part die. Fig. $12^a$ is a sectional view on the line *a a* of Fig. 12. Fig. $12^b$ is a plan view of the four-part die and its operating mechanism. Fig. 13 is a side elevational view showing the operating mechanism for the coned die, &c. Fig. $13^a$ is a detail view of the toggle-levers used in connection with the slide operating in conjunction with the four-part die. Fig. $13^b$ is a top plan view showing the four-part die and said toggle-operated slide in position. Fig. 14 is a side elevational view of a cam for operating the side plungers, &c., including the dumping-buckets. Fig. 15 is a top plan view of the vibrating arm for operating the buckets. Fig. 16 is a bottom plan view of said arm. Figs. $16^a$, $16^b$, $16^c$, $16^d$, $16^e$, $16^f$ are diagrammatic views illustrating different positions of the switch-tongue, whereby the buckets are alternately operated at every second revolution of the cam. Fig. 17 is a vertical sectional view through the vibrating arm, showing the relation of the switch-tongue to its operating-cam. Fig. 18 is a face view of the valve block or seat. Fig. 19 is a face view of the rotating valve coöperating with said seat to control the pressures and vacuums. Fig. 20 is a horizontal sectional view through said valve parts. Fig. 21 is a detail sectional view of the vacuum water-trap. Fig. 22 is a side elevational view of the valve and its holder, which are located in the bottom of the trap. Fig. 23 is a plan view of said valve and holder in position in the bottom of the trap, and Fig. 24 is a sectional view of the finished article.

This invention relates to a new and useful improvement in machines for making stoppers for bottles or other articles—such as spools, knobs, &c.—out of paper-pulp, the object being to convert the pulp from its disintegrated or separated form, where it exists in such a state in water, into the finished article.

In manipulating the pulp to be formed into articles it is first put in water in the proportion of about two grains of pulp to one cubic inch of water. This is thoroughly agitated, so as to separate the fibers of the pulp which are held in suspension by the water, the water acting practically as a vehicle to carry the pulp into the buckets, where it is drained of all free water, the pulp being then dumped into a trough to be acted upon by the plungers.

Referring to Figs. $10^a$, &c., which illustrate the different stages undergone by the pulp, I will state that from a density of two grains per cubic inch in the agitating-tank (which is the fluid state) the pulp-water is first dumped into the bucket and given the shape shown in Fig. $10^a$. Here the water is given an oppor-

'BEST AVAILABLE COP' tunity to drain off, and the density is increased to about ten grains of pulp per cubic inch of water. The pulp at this density is dumped into the trough, where it is acted upon by the first plunger and given the shape shown in Fig. $10^b$, wherein the density is slightly, if at all, increased. While in this shape the side forming-dies move up to compress the pulp into the shape shown in Fig. $10^c$, where its density is increased to about forty grains per cubic inch. After this the top-forming die comes down and compresses the cylindrical body of pulp endwise to the shape shown in Fig. $10^d$, where its density is increased to about fifty grains per cubic inch. The cylindrical block of pulp is now placed in the four-part die and subjected to lateral pressure, and its density is increased to about eighty grains per cubic inch. From this point the cylindrical body of pulp is forced through a tapered or conical die for the purpose of calendering its surface, which further compresses the pulp into the form of the finished stopper, which has a density of about ninety-five grains per cubic inch.

The actions of the several dies on the pulp result in a gradual reduction in volume and a proportionate increase in the density of the pulp until the desired reduced size and increased density is reached. During the different operations heretofore outlined the water which is pressed from the pulp is forced by air-pressure and also drawn by vacuum from the several dies, so as to give said dies an opportunity to act freely and quickly on the pulp fibers.

My present invention consists in the novel details of the various elements and combinations of elements herein shown and described for manufacturing pulp stoppers; and it also consists in the improved method of making pulp stoppers or similar articles, all as will hereinafter be described and afterward pointed out in the claims.

*Measuring-valve.*—In the drawings, 1 indicates an appropriate frame, preferably in the form of a casting and in or upon which are mounted the several parts comprising my improved machine. Supported above this frame 1 by appropriate standards 2 is a tank 3, in which is placed the pulp-water—that is, water containing about two grains of pulp per cubic inch. Referring to Fig. 2, it will be seen that this tank 3 contains a shaft 4, carrying angled flights or blades 5, which are designed to be revolved for the purpose of keeping the pulp-water in a state of constant agitation. Leading from the bottom of this tank 3 is a casing 6, having valve-seats at its upper and lower ends and also a laterally-disposed extension forming a measuring-chamber 7, the cubical contents of said chamber being regulated by an adjustable head 8, mounted on a threaded rod engaging a fixed nut at the end of the extension. In this manner the volume of pulp-water may be controlled, which is desirable in manufacturing stoppers of different sizes. It is almost unnecessary to say that when the head 8 is moved inwardly a small volume of water will be received by this measuring-valve, whereas when the head 8 is moved outwardly a larger volume will be received.

9 indicates a weighted valve coöperating with the upper end of the cylinder 6, said valve having a hollow tubular extension which receives the reduced end 10 of an operating-rod 11. This rod is connected at its lower end to a lever 12, which is operated by an eccentric-rod 13. When the lever 12 is moved upwardly to the position shown by the dot-and-dash lines, the shoulder at the end of the reduced portion 10 engages the tubular extension of valve 9 and lifts said valve to the position shown by dot-and-dash lines in Fig. 2. The pulp-water in the tank is then permitted to flow into the cylinder 6 and fill the same and its communicating chamber 7. When the lever 12 moves down to the position shown in dotted lines in Fig. 2, a shoulder $11^a$ on the rod 11 engages a valve 14, which coöperates with the seat on the lower end of cylinder 6 and permits the pulp-water to flow out of said cylinder 6 and its communicating chamber 7. It will be noticed, however, that valve 9 is permitted to seat itself, due to its attached weight, before the valve 14 is opened. The upper face of valve 14 is provided with a conical projection to prevent the pulp fibers from lodging thereon. A sleeve 15 is mounted on a spider $15^a$ to guide the upper end of rod 11 and engages the tubular extension on the upper valve 9 and the conical projection on the lower valve 14, so as to guide and hold said valves in their movement. A spring 16 is arranged under the lower valve 14 to return the same to its seat when rod 11 moves upwardly, said valve 14 being seated against the lower edge of cylinder 6 before the valve 9 is raised.

I will say here that the entire machine is driven from a single master-shaft, except the agitator, and the eccentric which operates the rod 13 is mounted on said shaft, so that a complete vibration is given to the lever 12 at each revolution of the shaft.

By referring to Figs. 1 and 11 it will be seen that the master-shaft, which is indicated at A, has mounted thereon an eccentric B, having the usual strap *b*, which has connected to it the rod 13.

The water, which is measured and discharged by means of the construction hereinabove described, is received into a spout 17, having two branches 18. (See Fig. 3.) The ends of these branch spouts are provided with discharge-openings 19, located over their respective buckets, and in order to avoid the whirl of the pulp-water I employ bridge-pieces 20 (see Figs. 2 and 3) over the openings 19, or I

BEST AVAILABLE COP' may flatten the lower ends of the discharge-spouts 19, as shown in Figs. $2^a$ and $2^b$, so that the pulp-water will issue in the form of a flat sheet and be more evenly distributed in the bucket. The flattened discharge-spout avoids the whirling action and also renders the use of the bridge-plate 20 for preventing said action unnecessary.

I have before stated that the measuring-valve discharges the predetermined quantity of the pulp-water into the spout 17 at every revolution of the main driving-shaft A. Means are provided for directing successive discharges of pulp-water into the branch spouts alternately, and this is accomplished by the use of a swinging valve 21, mounted on an appropriate post which is provided with a lateral projection 22 at its upper end, fitting in a slot in the upper end of a lever 23, pivoted at 24 to a casting forming the side walls and bottom of the spout. The top wall of the spout is preferably movable in order that access may be gained to the interior in the event that the spout is choked up with the pulp fiber. The lower end of lever 23 is slotted to receive a pin 25, carried by the rocking toothed segment 26, pivotally mounted on one of the cross-pieces of the frame 1. This toothed segment is operated in opposite directions from its medial or central position alternately at each revolution of the main shaft A. The means for rocking this segment are more fully illustrated in Figs. 14 to 17, inclusive, and comprise the following elements:

*Alternate bucket-discharge.*—Mounted on the main shaft A is a cam C, having a driving-pin *c* projecting from its periphery, which pin is adapted to coöperate with a switch-tongue pivotally mounted in the vibrating lever 27 and which vibrating lever is provided at its front end with a pin or roller 28, fitting in an elongated slot in the lower end of the toothed segment 26, which slot is shown in Figs. 9 and 10. The vibrating lever 27 is pivotally mounted in suitable brackets carried by the cross-pieces at the back of the frame 1, as clearly shown in Fig. 14. At each revolution of the main shaft A and the disk C the pin *c* passes the vibrating arm 27 and in doing so rocks said arm alternately in opposite directions in the following manner: On the under side of the lever 27 are depending marginal flanges 29, while pivoted between said flanges is a switch-tongue 30. This switch-tongue, as shown in Fig. 17, carries a spring-pressed pin 31, designed to be received in one of two notches in its different positions, so as to hold the switch-tongue against accidental displacement.

Referring now to Fig. $16^a$, it will be observed that the pin *c* is moving in the direction of the arrow and that the switch-tongue is so positioned that the pin will pass under the switch-tongue and in so doing will by its initial engagement with the cam-surface $30^a$ move the vibrating arm 27 to the position shown in Fig. $16^b$, in which position it will be noticed that the pin *c* is passing along a straight portion $30^b$ of the switch-tongue, which insures the vibrating arm 27 remaining stationary in its displaced position during the passage of the pin *c* along the straight face $30^b$. This pause in the movement of the vibrating arm 27 and the toothed segment 26, which it rocks, is utilized to temporarily arrest the buckets in their dumping position so as to give the drained pulp time to discharge into its receiving-trough. As the segment moves to dump the bucket its pin 25 will strike the lever 23 (see Fig. $8^b$) and rock said lever so as to move the gate-valve to the opposite position or in a position to direct the pulp-water discharging from the measuring-valve into the dumped bucket, when it is restored. As the pin *c* leaves the straight face $30^b$ it engages the enlargement $30^c$, as shown by dotted lines in Fig. $16^b$, and throws the switch-tongue to the position indicated by dotted lines in said figure, after which the pin *c* rides down the inclined face $30^d$ and in so doing moves the vibrating arm and its actuated parts except the gate-valve and its operating-lever, which remain stationary until the other bucket is being dumped, back to its normal or central position, as shown in Fig. $16^c$, the pin *c* issuing from engagement with the vibrating arm while said arm is in this central position. Upon the next revolution of the disk C the pin *c* will ride on the inclined face (corresponding to $30^a$) on the opposite side of the switch-tongue, then along a straight face, (corresponding to $30^b$,) during which time the vibrating arm 27 will be caused to pause at its extreme opposite position, after which as the pin passes the enlargement (corresponding to $30^c$) it will enter the incline (corresponding to $30^d$) and return the vibrating arm to its central position, the pin issuing from engagement with the tongue and vibrating arm while said arm is in its central position.

Fig. $16^d$ shows the pin entering the cam-groove in the vibrating arm and coöperating with the switch-tongue to move the same in the opposite direction above described, as shown in Fig. $16^e$, the vibrating arm being returned to normal position, as shown in Fig. $16^f$, where the switch-tongue is in the same position as that illustrated in Fig. $16^a$.

It will be observed in connection with the above description that at each revolution of the main shaft and of the pin *c* the vibrating arm 27 is first moved in one direction laterally and caused to pause at its extreme lateral position, the said arm being restored to its central position, where it remains until the pin on its next cycle will engage the arm and rock it in the opposite direction, causing it to pause in its extreme lateral position and re-

BEST AVAILABLE COPY turning it in its central position to be laterally displaced upon the next succeeding cycle of the pin.

Referring now to Fig. 9, it will be observed that hollow posts 32 are supported by the cross-piece of the main frame, which posts are provided with hollow supporting-heads 33, having rubber cushioning-strips 34 secured to the upper edges thereof. 35 indicates buckets whose bottoms are formed of wire mesh 36 and which have laterally-extending lugs mounted on shafts 37, journaled in suitable brackets 38, extending up from the frame. These shafts 37 carry mutilated pinions 39, which are designed to mesh with the teeth of the segment 26 when said segment is moved in one direction. It will be seen that the segment at each end of its toothed portion is provided with a tooth $26^a$ and that the mutilated pinion 39 is provided with a space to receive this wide tooth and also a wide or blind tooth $39^a$. Thus when the parts are in the positions shown in Fig. 9 if the segment 26 is rocked to the right it will dump the bucket 35 at the right; but the bucket at the left will remain at rest, during which resting period the pulp is allowed to drain. The gate-valve 21 is moved from its position where it directed the pulp-water from the measuring-valve into the bucket at the left to a position to direct the pulp-water into the bucket at the right, when it is restored. When the segment 26 reaches its extreme position and its actuated dumping-bucket is inverted, the pause occasioned by the straight face $30^b$ will afford ample time for the drained pulp to be discharged into its receiving-trough. The restoration of the segment 26 to its initial or central position returns the dumped bucket to its upright position in readiness to receive another charge, which charge is directed thereinto by the gate-valve 21, which was during the dumping action of the bucket moved to the opposite side of the spout. The movement of segment 26 to the left will dump the bucket at the left and permit the bucket at the right to remain stationary.

The water draining from the pulp in the buckets through the wire-mesh bottom is conducted down through the hollow supporting-post 32 and into a discharge-pipe, and at the time the bucket is dumped the drained pulp has a density of about ten grains per cubic inch. In Fig. 10 I have shown one of the buckets in a dumping position, the segment 26 being laterally displaced.

*The first forming-plunger.*—Referring now to Fig. 4, 40 indicates a trough into which the buckets alternately discharge the drained pulp approximately in the shape illustrated in Fig. $10^a$, said trough being preferably provided with rubber strips 41 along its side edges to cushion the buckets. When the contents of a bucket are discharged into the trough 40, a plunger 42 is moved forward by appropriate mechanism, which I will now describe, to force the plastic pulp into the position to be acted upon by the side plungers.

By referring to Fig. 1 it will be seen that plunger 42 is mounted upon the end of a rod 43, which rod is guided in a bracket extending up from the rear end of trough 40 and a second bracket extending from back of the frame 1. This rod carries a collar 44, preferably adjustably mounted thereon, to which collar is pivotally connected a link 45, said link having its opposite end connected to a bell-crank lever 46. (See also Fig. 14.) This bell-crank lever is pivotally mounted upon a suitable shaft A', carried by the frame 1, and carries a roller at its lower end which coöperates with a cam-groove in the side face of disk C. The parts are of course so timed that the plunger 42 is moved forwardly as each bucket discharges its contents in front thereof, the forward extremity of the movement causing the front face of the plunger to occupy the position shown in Figs. 5 and 6. When in this forward position, by the construction of the cam-groove the plunger 42 is made to pause and then be retracted where it is made to pause in its rearmost position, so as to give the bucket an opportunity to dump its contents in front of the plunger, the plunger moving forward with the drained pulp in front thereof until it is arrested to form the wall, while the side plungers, now about to be described, are moved inwardly.

*The side plungers.*—47 indicates lateral extensions forming guideways at the front end of the trough 40, in which are slidingly mounted what I have designated as "side plungers" 48. The faces of these side plungers are recessed, so as to be semicircular in form, and are perforated, so that water may be drained therethrough. Each plunger is connected to a stem 49, which is slotted to receive the end of a lever 50, (see Fig. 10,) pivoted on the frame of the machine, the lower ends of said levers 50 being connected to links 51, the opposite ends of said links being connected to a lever 52, also pivoted on the framing of the machine and which is operated by a link 53, whose lower end is connected to a lever 54, pivoted on a shaft $A^2$, mounted in a bracket extension secured to the rear portion of the frame, said lever 54 having a roller or lateral projection which enters a side cam-groove in the disk C. (See Figs. 11 and 14.) This cam is so timed with respect to the operation of the machine that when the plunger 42 moves forwardly to force the pulp into the space between the side plungers and while said plunger 42 is stationary in its forward position the side plungers move inwardly, so as to compress the pulp into the shape shown in Fig. $10^c$, the water escaping therefrom passing through the perforations in the faces of the hollow side plungers and also being drawn down through a perforated box 55, which forms a portion of the bottom wall of the front end of trough 40 and which also forms the bottom of the mold formed by the side plungers in their innermost position.

*The transferring-carrier.*—Box 55 is secured to the forward end of a sliding plate 56, which constitutes a carrier for the cylindrical body of pulp. This carrier is provided with an adjustable plate 57 on its under side, from which depend fingers serving as side supports for the cylinder of pulp. A movable plate 58, also provided with fingers, is mounted on the under side of the carrier, so as the carrier moves forward the fingers on the sliding plate 58 will support the cylinder of pulp as it is being moved by the carrier. The means for operating the carrier comprise a link 59, pivotally connected to the rear end of the carrier and to a bell-crank lever 60. (See Figs. 1, 11, and 14.) This bell-crank lever 60 is mounted on the shaft A′ and is provided with a roller at its lower end, which coöperates with a cam-groove in the side face of the disk C.

The parts are so timed that after the cylinder of pulp is shaped up by the side plungers and receives its initial end compression, which will now be described, the carrier is moved forward, so as to displace the perforated bottom 55 and in lieu thereof aline an opening in the carrier with the opening in the forward end of the trough formerly filled by the box 55. The cylinder of pulp is now forced through this opening onto a comb 61, whence it is moved by the carrier into the opening of the four-part die. As the carrier moves forward a projection 62 on the rear end of the movable finger-carrier 58 engages a set-screw 63 (see Fig. 4) in its path, and thus retracts the movable plate 58 and its carried fingers away from the cylinder of pulp when the same is located over the opening in the four-part die.

*The end-compression plunger.*—As the side plungers move up to form the cylindrical body of pulp, as before described, the said side plungers are arrested in their inner position, and during this period of rest an "end-compression plunger," as I have termed it, (illustrated in Fig. 6 at 64,) is moved downwardly to subject the cylinder of pulp to end pressure. Plunger 64 is mounted in a suitable guide, and, as shown in Fig. 8, is formed hollow for purposes hereinafter set forth.

A link 65 is connected to the upper end of plunger 64, which link is connected at its lower end to a lever 66, pivoted on the shaft A′, mounted in the bracket secured to the rear portion of the framing 1, said lever 66 carrying a cam-roller which coöperates with a cam-groove in the side face of disk C. (See Fig. 11.)

Plunger 64 is so timed that when the plunger 42 moves into place the pulp between the side plungers and after the side plungers move up to compress the pulp into cylindrical shape the plunger 64 moves down, (before the carrier is actuated,) so as to subject the cylinder of pulp to an end compression. A pause in the cam causes the plunger to be temporarily arrested in the position shown in Fig. 6. As the carrier 56 moves forwardly the plunger 64 is caused to descend, so as to force the cylinder of pulp through the opening in the carrier onto the comb 61 and in advance of the long fingers on the movable plate 58. After this is done the plunger 42 starts to move backward, the side plungers are withdrawn, and the plunger 64 is raised for another operation.

*The four-part die.*—When the carrier moves forward to the position shown in Fig. 8, the cylinder of pulp is deposited in an opening in the four-part die designed to receive it, and in order to prevent the pulp from adhering to the carrier-fingers the plate 58 is arrested, as before described, while the carrier continues its forward movement slightly beyond the point of arrest of said plate 58.

The open position of the four-part die is shown in Fig. 4, wherein it will be seen that the opening in the center of the die is closed by a plate 67. The plate 67 operates in a stationary base for the four-part die, said base being supported by the framing of the machine by means of a suitable bracket 69. (See Figs. 1 and 6.) The plate 67 is perforated, as shown in Fig. 4, so as to permit the water to pass therethrough when said plate is in the position shown in Fig. 4—to wit, serving as a bottom for the opening in the four-part die—but when said die members have been operated so as to contract the opening and compress the pulp cylinder laterally to the size shown in Fig. $10^e$ (the position of the die parts being shown in Fig. 5) the plate 67 is moved so as to register an opening 70 therein with the die-opening for the purpose of permitting the compressed cylindrical body of pulp to be forced through said opening 70 and down into the conical die, as shown in Fig. 6. The means for operating this slide-plate 67 comprises a toggle mechanism consisting of links 71 and 72, (see Figs. 13, $13^a$, and $13^b$,) the former of said links being pivotally connected to the framing and the latter to the side plate 67. To an extension of link 71 is connected a link 73, whose lower end is pivotally connected to a rock-arm 74, mounted on the rock-shaft $A^3$, journaled in the framing of the machine. Shaft $A^3$ has a rock-arm 75 integral with arm 74, connected by a link 76 to a lever 77, pivotally mounted on the shaft A′. Lever 77 carries a roller which coöperates with a cam-groove in the side face of a disk D, mounted on the main shaft A. These parts are so timed that when the die elements are open the plate 67 is so positioned as to form a perforated bottom for the opening in the die, and after the die closes the plate 67 is moved so

BEST AVAILABLE COPY as to register its opening 70 with the opening in the die to permit the compressed cylinder of pulp to be forced by the plunger into the conical die located beneath the four-part die.

The stationary base of the four-part die is provided with a central opening 78, in which operates and is centered the upper end of the conical die. The stationary base is also provided with an annular flange 79, which is screw-threaded to receive a supporting-ring 80, said supporting-ring holding in position a movable ring 81, which movable ring 81 is connected to an operating-lever 82, (see Fig. 12,) pivoted in the bracket 69. The rear end of this lever is connected to a toggle device comprising links 83 and 84, the former of which is pivotally connected to the lever 82, while the latter is mounted on the side frame of the machine. To the toggle-levers 83 and 84 is connected a link 85, which link in turn is connected to a lever 86, pivoted on the shaft A′, said lever 86 having a roller coöperating with a cam-groove in the side face of the cam E. (See Fig. 11.) These parts are so timed that after the delivery of the cylinder of pulp in the opening of the four-part die and while the slide 67 is so positioned that it forms a perforated bottom for the opening in said die the elements of the die start to move inwardly toward each other, so as to compress the pulp, and the pulp is held thus confined by the die members for a short period of time in order to give the water an opportunity to escape and be carried off. The movement of the lever 82 in one direction effects an opening of the die members, and the movement of said lever in the opposite direction closes said die members. The opening and closing movements of the die members is predicated upon the partial rotation of the ring 81, which ring carries four pins or projections 87, passing up through elongated openings in the stationary die-base. The upper ends of these pins are received in blocks 88, (see Figs. 5 and $5^a$,) which blocks operate in recesses in the under faces of the die members 89.

By referring to Fig. 4 it will be observed that when the ring 81 is rotated to the right the die members 89 are opened and the toggle is in the full-line position shown in Fig. $12^a$. When the toggle is moved to the position shown in dotted lines in Fig. $12^a$, the ring 81 will be moved toward the left, its pins passing through the slotted openings in the stationary base and through the blocks 88, causing the die members 89 to move in the direction of the arrows in Fig. 4, their coöperating inclined faces assisting in the distribution of the strains not only between the pins 87, but also the die members themselves.

It will be observed that the stationary base is provided with guide-plates in the form of marginal flanges 90 on its four sides, and each die member moves along its respective guide-plates either from the position shown in Fig. 4 to the position shown in Fig. 5, or vice versa, the arrows on the die-plates indicating their direction of movement respectively.

*The die-plunger.*—Referring to Fig. 1, it will be seen that the framing 1 has an upward extension at its front to which is secured a bracket forming a guide for a plunger-sleeve 91 and plunger 96. (See also Fig. 6.) This plunger-sleeve 91 is mounted on the lower end of the plunger 96 and at its upper end is screw-threaded to receive jam-nuts which clamp in position a yoke 92, said yoke being connected to rods 93, which extend upwardly on each side thereof and pass through ears 94, projecting laterally from a cross-head 95, fixed on the hollow plunger 96. The rods 93 pass loosely through the ears 94 and are threaded at their upper ends and provided with jam-nuts 97. A spring 98 bears upon the plunger-sleeve 91, tending to hold the same down at all times. Links 99 are mounted on each side of the collar 95 and extend down and are connected to arms 100, fixed on the shaft $A^3$, (see Fig. 12,) which arms are connected in turn by a link 101 to a lever 102, pivotally mounted on the shaft A′. This lever 102 is provided with a roller coöperating with a cam-groove in the side face of the disk E. (See Fig. 11.) The cam-disk E is so timed that after the carrier deposits the cylinder of pulp in the opening in the four-part die the plunger 96 and the plunger-sleeve 91 are caused to descend until they occupy a position above the opening in the four-part die. Here the sleeve 91 is arrested and the plunger 96 is caused to remain stationary for a short period of time while the four-part die is being operated to compress the cylinder of pulp. The compressing action of the four-part die forces the water out of the pulp, and the perforations in the slide-plate 67 permit the water to escape. The water at the top of the four-part die passes up between the plunger 96 and the sleeve 91 and is conducted off by a pipe $91^a$. When the four-part die has completed its compressing action, the plate 67 is moved to locate the opening 70 in line with the opening in the four-part die, and the plunger 96 is caused to move downwardly, so as to carry the compressed cylinder of pulp into the conical die, as shown in Fig. 6. In the continued downward movement of the plunger 96 the ears 94 slide down the rods 93, so that the spring 98 is depended upon to hold the plunger-sleeve 91 on top of the four-part die. As the plunger 96 is raised it moves upwardly through the plunger-sleeve 91 until the bottom of plunger 96 is flush with the lower face of plunger-sleeve 91, at which time the ears 94 engage the nuts 97 on the upper ends of rods 93 and lift the plunger-sleeve against the energy of spring 98.

*The conical die.*—Referring to Fig. 1, it will be observed that a bracket is provided for

BEST AVAILABLE COPY guiding what I term the "conical die" in its movement, said conical die being illustrated in Figs. 6, 7, and 8, where it will be seen to consist of a hollow tube 103, through which passes a hollow post $103^a$, whose lower end is mounted in a bifurcated frame straddling the shaft $A^3$. This conical die is provided at its upper end with a centering portion designed to be received in the opening 78 of the fixed base of the four-part die, and to the enlarged head portion of the conical die are secured links 104, which are connected to bell-crank levers 105, loosely mounted on the shaft $A^3$. A link 106 connects this bell-crank lever to a lever 107, pivotally mounted on the shaft A' and carrying a roller which coöperates with a cam-groove in the side face of the disk D. The cam-groove in disk D is so timed that as the pulp is deposited in the opening of the four-part die, as shown in Fig. 8, the conical die moves up into position, and after the four-part die has acted on the pulp and the slide-plate 67 has placed its opening 70 in registration, so that the plunger 96 can force the compressed pulp therethrough, said plunger 96 forces the compressed pulp through said opening 70 and down into the conical die, as shown in Fig. 6. This action calenders the surface of the pulp stopper and also gives it its conical or tapered shape. The plunger 96 then rises, leaving the stopper on the head of the post $103^a$ and in the conical die. The conical die is now caused to recede from the stationary four-part-die base, and in so doing moves down away from the stopper, so as to expose the same, and when the stopper is exposed an ejector mechanism is put into operation, so as to knock the stopper off of the post $103^a$.

*The ejector mechanism.*—Referring to Fig. 13, it will be seen that the hollow stem of the conical die carries an extension 108, provided with a pin or projection which operates in a cam-slot of a bell-crank lever 109, the upper end of which is provided with a laterally-extending head 110, whereby when the conical die descends the bell-crank lever will be moved forwardly to the position shown by dotted lines in Fig. 7, wherein its head 110 has struck the formed stopper and knocked it from the post $103^a$.

*The driving mechanism.*—Referring to Fig. 11, it will be seen that the shaft A has a gear 111 mounted on one end thereof, with which gear meshes a pinion 112 on the end of a shaft carrying, preferably, two pulleys 113, one of them being fast to said shaft and the other loose thereon for well-understood purposes. The object in thus reducing the drive of the main shaft A is to utilize ordinary factory power, and to produce the best results in the manufacture of stoppers according to my invention I prefer to operate the shaft A at such speed that about twelve stoppers per minute are turned out by the machine. The machine could be run at a much higher speed; but in view of the fact that it takes time to express the water from the pulp and carry it away I prefer to run it at a low speed and make a more compact and serviceable stopper and one which can be dried out in the drying-oven in from three and one-half to five hours.

*The air-valve.*—On the end of shaft A and preferably opposite the gear-wheel 111 is mounted a valve 114, which is splined on the shaft and which coöperates with a valve-seat 115, pinned to the side frame 1. A spring 116 bears against the valve to hold the same firmly to its seat.

The valve-seat 115 is ported, as shown in Fig. 18, and these ports communicate with high and low pressures and high and low vacuums through the instrumentality of concentric grooves in the rotating valve, which cause said ports to be placed in communication with each other in the manner and for the purposes now to be described.

*Side-plunger pressure and vacuum.*—117 indicates a pipe leading from a low-pressure reservoir to a port 118 in the valve-seat, which port when the groove 119 in the valve registers therewith is designed to be placed in communication with a port 120, communicating with a pipe 121, connected by a flexible pipe 122 to the upper end of the hollow plunger 64. Groove 119 in the valve is so timed that after the plunger 64 reaches the position shown in Fig. 6 and in moving to the position shown in Fig. 7 low pressure is admitted through said hollow plunger, which causes the air to pass through the perforations in plunger 64 and free itself from the body of pulp and also the fibers tending to adhere thereto.

Before pressure is admitted through the plunger 64 a low vacuum is produced in the hollow side plungers 48 and the box 55 by means of the following: 123 indicates a pipe connected to a low-vacuum pump and terminating in a port 124 in the valve-seat. A groove 125 in the valve is designed to register port 124 with a port 126, communicating with a pipe 127. This pipe leads from the upper part of a water-trap 128, into which discharges a pipe 129, said pipe 129 (see Figs. 11 and 13) being provided with two branches, one leading to one side plunger and the other to the other side plunger.

By referring to Figs. 6, 7, 8, and 10 it will be seen that the box 55 is provided with lateral openings which register with openings communicating with the branch pipes 129, so that water received by the box when in its rearmost position will be delivered into the branch pipes 129.

*The water-trap.*—When suction is exerted in the chambers of the hollow side plungers, water will be drawn from the pulp through said chambers and through the pipe 129 into the casing 128 of the water-trap, the water filling into the bottom of said trap and the air

BEST AVAILABLE COPY being continually exhausted from said trap through the pipe 127, the valve-ports, &c. The casing 128 is provided with a threaded boss on its lower end, onto which is screwed a nipple 130, said nipple containing a valve-supporting spider 131, carrying a rubber or other suitable disk valve 132. The nipple 130 has connected to it a pipe (not shown) for conducting the water off to some suitable receptacle. When the air is exhausted in the trap-casing 128, the valve 132 is drawn to its seat, so as to effectually close the bottom of the trap. Continued suction will cause the water from the side plungers to be delivered into the trap until the plunger 64 is ready to continue its downward movement, at which instant the groove 125 passes out of registration with the valve-ports, whereupon atmospheric pressure enters the trap through the pipe 129, and the hydrostatic pressure on the valve will cause said valve to drop from its seat and permit the accumulated water in the trap to be discharged. When the side plungers move up to their compressing position, suction is again exerted through the devices just described, and coincidently therewith low pressure is admitted through the hollow plunger 64. In this manner the air seeks to enter the cylinder of pulp at the top and tends to force the water not only laterally through the side plungers, but downwardly through the box 55. The low vacuum in the side plungers tends to draw the water therethrough and deliver it into the trap, where it accumulates until the vacuum is relieved. The accumulated water is discharged from the trap intermittently upon the relief of the vacuum at each operation.

*The die-plunger pressure and vacuum.*—133 indicates a pipe leading from some suitable source of high-pressure supply and terminating in a port 134 in the valve-seat. With this port is designed to register a groove 135 in the valve, which groove establishes communication with a port 136, leading into a pipe 137. Pipe 137 terminates in a flexible tube 138, (see Figs. 1 and 11,) connected to the upper end of the hollow plunger 96. It will be seen by referring to Fig. 19 that the forward end of groove 135 is considerably reduced, which is for the purpose of admitting only a limited quantity of high-pressure air into the die-opening when the four-part die is compressing and laterally reducing the pulp cylinder. However, about the time that the plunger 96 descends, so as to force the reduced pulp cylinder through the opening 70 and into the conical die, a greater volume of high-pressure air is admitted, which materially assists in forcing the water out of the pulp. When the stopper is in the conical die, as shown in Fig. 6, a high vacuum is exerted through the post 103ª, so as to draw the water down through said post and into a trap similar to the vacuum water-trap heretofore described.

Referring to Fig. 18, 139 indicates a pipe leading from a high-vacuum exhaust-pump and terminating in a port 140 in the valve-seat, which is designed to register with a groove 141 in the valve, said groove establishing communication therebetween, and a port 142, which leads into a pipe 143, connected by a flexible pipe 144 to the lower end of post 103ª. (See Fig. 13.) 145 indicates a trap-casing in all respects similar to the one heretofore described and which is provided with a valve in its bottom like the valve 132, said trap 145 accumulating the water delivered thereinto from the post 103ª until the vacuum is relieved from the stopper.

*Ejecting-pressure.*—I have just described the post 103ª as having a vacuum established therein for the purpose of drawing water from the vacuum stopper; but it is obvious that this vacuum would tend after the conical die recedes from the stopper to hold the stopper on the head of the post and perhaps cause the perforated top wall of said post to become clogged with pulp fibers. I have therefore provided means to admit pressure to the post 103ª at about the time that the ejecting-head 110 strikes the stopper. To produce this pressure in the post, I provide the low-pressure port 118 with a side lead and also the high-vacuum port 142 with a side lead, which are adapted to register with a groove 146 in the valve, whereby the instant that the ejector-head 110 strikes the finished stopper the groove 146 will establish communication between the low-pressure port 118 and the post 103ª through the pipe 143. At the same time a groove 147, concentric with the groove 119, will establish communication between the ports 118 and 120 for admitting pressure to the plunger 64 at the time that said plunger is withdrawn from the stopper.

In referring to "high pressures" in the above I mean pressure of about ten pounds per square inch and "low pressure" a pressure of about four pounds per square inch. By "high vacuum" I mean about twenty-six mercurial inches and "low vacuum" about four mercurial inches.

*Suction in draining-pipes.*—By referring to Fig. 9 it will be observed that the post 32, through which the water from the draining-receptacle passes into a suitable discharge-pipe, is provided with an upright vent-pipe 32ª, which enters the post 32 some distance below its upper end. The purpose of this is to regulate the amount of suction produced by the descending column of water in the post 32 on the pulp in the bucket 35. When the bucket 35 receives a discharge of pulp-water, the fibers are distributed over the entire wire-mesh bottom 36, and it is desirable to draw as much water from the pulp in this draining-receptacle as can be drawn without interfering with its plasticity, which controls its ready discharge from the draining-recep-

BEST AVAILABLE COPY tacle. The water, rapidly draining from the bucket, will fill the pipe $32^a$, and in descending will as the supply is shut off create a partial vacuum under the bucket which will tend to draw air through the mass of pulp, and consequently force the remaining water in the pulp down into the receiving-basin 33. This action, while desirable to a certain extent, is objectionable if carried too far, because the suction tends to draw the pulp fibers down into the wire mesh 36, so as to interfere with the discharge of the mass of pulp when the bucket is dumped. I have therefore provided the vent-pipe $32^a$, which as the column of water descends in the post 32 will admit air on top of the column of water and relieve the partial vacuum caused by the descending column. The purpose of locating the vent $32^a$ some distance below the upper end of post 32 is to obtain the benefit of the partial vacuum resulting from the descending column of water from the basin 33 to a point below the opening of the vent-pipe $32^a$, at which time the suction beneath the draining-receptacle is relieved.

*The article.*—In Fig. 24 I have shown a sectional view of a pulp stopper made in accordance with my improved apparatus, and in describing the fibration I will briefly recapitulate the steps employed for converting the pulp from its disintegrated condition in the water to the finished stopper.

Starting with the pulp-water having a density of two grains of pulp per cubic inch of water, this pulp-water is measured and delivered into a draining-receptacle in the form of buckets 35, and after being drained of such excess water as will flow off the drained pulp is discharged into the trough 40, where the fibers lie principally in a horizontal direction. As the plunger 42 forces the pulp into the space between the side plungers the bulk is not appreciably decreased, nor are the fibers disturbed more than to change their position. As the side plungers 48 move toward each other the bulk of the mass is diminished and at the same time the position of the fibers is changed to the extent that where lateral pressure is applied to the plastic pulp of the low density of the mass at this stage—to wit, about ten grains of pulp per cubic inch—the fibers aline themselves practically at right angles to the direction of pressure, or at least they seek to assume this position, with the result that many of the fibers, and, in fact, it may be said that the majority of them, lie principally in a vertical direction parallel to the axis of the pulp cylinder resulting from the inward movement of the plungers 48. At this period the plunger 64 descends and subjects the cylinder of pulp to an endwise pressure, resulting in a disturbance of the fibers throughout the cylinder and at the ends of the cylinder forcing some of the fibers to lie substantially in a horizontal direction, as shown at *y*, Fig. 24, while others of the fibers, which were longitudinally disposed, display an inclination to bend from their longitudinal position to the horizontal position, as indicated by the letter *x*. These fibers, which constitute the body of the stopper, having no freedom to take new positions, will under end compression be practically upset—that is, they assume angular positions, as indicated, showing their tendency to aline themselves at right angles to the direction of pressure, which tendency is restrained, however, by the confining-walls of the mold.

After the plunger 64 acts upon the pulp as above described it is transferred to the four-part die, where the said four-part die subjects the pulp to lateral pressure, after which the plunger 96 forces the pulp cylinder into the conical die, and this imparts a finishing action to the extent that the fibers on the periphery of the stopper are matted or calendered, as indicated at *z*.

The four-part die in acting upon the pulp does not disturb the end lines, but merely decreases the diameter of the cylinder while increasing the density of the pulp. Thus the condition of the fibers produced by the action of the side plungers 48 and the end plungers 64 when the pulp was at a low density is preserved, and the four-part die merely acts to increase the density without materially disturbing the condition of the fibers. The action of the four-part die, however, does tend to straighten the fibers which were disturbed by the endwise pressure resulting from the action of the plunger 64. By this I mean that the surface of the cylinder of pulp after being acted upon by the plunger 64 shows distinct wavy lines of fibers, and these wavy lines after the action of the four-part die are less distinct, due to the reduction in the diameter of the stopper. The wavy condition of the fibers resulting from the endwise pressure is an important step in the manufacture of pulp stoppers, for the reason that the surface of stoppers made according to my improved apparatus and method do not have creases or folds, which sometimes exist in the manufacture of pulp stoppers where no endwise pressure is used. The disturbance of the longitudinally-disposed fibers by end pressure also tends to make the stopper more resilient than in the case where no such end pressure is used, but where the fibers lie principally in a longitudinal direction.

Instead of having the walls of the four-part die parallel, as shown in the drawings, it is obvious that the opening in the die could be made slightly tapered, or the elements of the die could be made to produce articles of different shape.

I do not in this application claim the construction of the stopper shown in Fig. 4, as

BEST AVAILABLE COPY the same forms the subject-matter of a companion application filed by me of even date herewith and serially numbered 241,866.

I am aware that minor changes in the construction, arrangement, and combination of the several parts of my device can be made and substituted for those herein shown and described without in the least departing from the nature and principle of the invention.

Having thus described the invention, what is claimed as new, and desired to be secured by Letters Patent, is—

1. In a machine for forming pulp articles, the combination with a forming mechanism, of a draining-chamber for initially receiving the pulp-water and draining it, means for discharging the drained pulp from said chamber to the forming mechanism, and means for measuring and delivering the pulp-water into said draining-chamber; substantially as described.

2. In a machine for forming pulp articles, the combination with a receptacle containing pulp-water, of a measuring device, a plurality of draining-receptacles into which the pulp-water is delivered, and a forming mechanism common to said draining-receptacles; substantially as described.

3. In a machine for forming pulp articles, the combination with means for measuring pulp-water having a predetermined proportion of pulp per cubic inch of water, a receptacle for receiving said pulp-water and for collecting the pulp fibers while permitting the water to drain therefrom, a forming mechanism comprising instrumentalities which act upon the pulp to gradually reduce its volume, giving it shape and at the same time increasing its density and means for discharging the drained pulp from the draining-receptacle to said forming mechanism; substantially as described.

4. In a machine for forming pulp articles, the combination with a trough for receiving the drained pulp, a plunger for initially compressing said pulp, side plungers operating at right angles to said first-mentioned plunger, and a vertically-operating plunger operating at a right angle to said side plungers; substantially as described.

5. The combination with mechanism for measuring pulp of low density, a draining-receptacle into which the measured pulp is placed and permitted to drain so that the pulp has a higher density, means for discharging the drained pulp from the draining-chamber to forming mechanism and forming mechanism for subjecting the pulp to lateral and endwise pressures to increase the density thereof; substantially as described.

6. In a machine for forming pulp articles, the combination with a forming mechanism and a draining-receptacle, means for discharging the drained pulp from the draining-chamber to forming mechanism, of means for measuring pulp-water which is delivered to said draining-receptacle, said means comprising a chamber opening into a tank containing the pulp-water, a valve for opening and closing said communication, and a valve at the opposite end of the chamber for controlling the discharge of pulp-water from said chamber; substantially as described.

7. In a machine for forming pulp articles, the combination with a forming mechanism and a draining-receptacle, of means for measuring the pulp-water which is delivered into said draining-receptacle, said means comprising a chamber opening into the tank containing the pulp-water, means for regulating the cubical contents of said measuring-chamber, valves at opposite ends of the chamber, and means for alternately opening and closing said valves; substantially as described.

8. In a machine for forming pulp articles, the combination with a forming mechanism and a draining-receptacle, of a tank containing pulp-water, a measuring-chamber communicating with said tank, means for regulating the cubical contents of said measuring-chamber, valves at opposite ends of said chamber which are alternately opened and closed, and means common to both of said valves for operating them; substantially as described.

9. In a machine for forming pulp articles, the combination with a forming mechanism, of a plurality of draining-receptacles, a measuring device common to all of said draining-receptacles, and means whereby the contents of the measuring device is successively received by the different receptacles; substantially as described.

10. In a machine for forming pulp articles, the combination with a forming mechanism, of a plurality of draining-receptacles, a measuring device, a trough for receiving the pulp-water measured by said device, branch troughs leading to the different draining-receptacles, and means in said trough for directing the pulp-water discharged from the measuring device alternately into one and then the other of said receptacles; substantially as described.

11. In a machine for forming pulp articles, the combination with a forming mechanism, of a plurality of draining-receptacles common to said mechanism, a single measuring device for the pulp-water common to said receptacles, and means for alternately filling said draining-receptacles; substantially as described.

12. In a machine for forming pulp articles, the combination with a forming mechanism, of a draining-receptacle, a measuring device for the pulp-water, a trough for conducting pulp-water from the measuring device to the draining-receptacle, and means in said trough for preventing the swirl of the water as it is discharged into the draining-receptacle; substantially as described.

BEST AVAILABLE COP'

13. In a machine for forming pulp articles, the combination with a forming mechanism, of a draining-receptacle, a measuring device for the pulp-water, a trough for conducting the pulp-water from the measuring device to the draining-receptacle, and means for distributing the pulp-water in the draining-receptacle whereby its fibers are substantially of an even depth over the bottom of said draining-receptacle; substantially as described.

14. In a machine for forming pulp articles, the combination with a trough which receives the drained pulp fibers, a plunger for moving said fibers to one end of said trough, and lateral plungers which act to compress the pulp into cylindrical form while it is being held by said first-mentioned plunger; substantially as described.

15. In a machine for forming pulp articles, the combination with a trough for receiving the drained pulp fibers, a plunger for moving said fibers to one end of said trough, said plunger acting as a side wall to hold the fibers at the end of the trough, and laterally-movable plungers operating at an angle to the movement of said first-mentioned plunger; substantially as described.

16. In a machine for forming pulp articles, the combination with a trough for receiving the drained pulp, a plunger operating in said trough to move said fibers to one end thereof, laterally-movable plungers for compressing the fibers into cylindrical form at the end of the trough, and a vertically-movable plunger for operating upon the end of the pulp cylinder and compressing the same longitudinally; substantially as described.

17. In a machine for forming pulp articles, the combination with laterally-movable plungers for initially shaping the pulp fibers into the form of a cylinder, the mold-cavity between said plungers having a bottom wall for supporting the fibers at the time of such compression, and a vertically-movable plunger forming the top wall of said cavity for compressing the cylinder longitudinally so as to decrease its length at the time that it is confined between said laterally-movable plungers; substantially as described.

18. In a machine for forming pulp articles, the combination with laterally-movable plungers for initially shaping the pulp fibers, of openings in the faces of said plungers, and a vacuum-pipe connected with said openings to draw off the water as the fibers are compressed; substantially as described.

19. In a machine for forming pulp articles, the combination with hollow laterally-movable plungers whose faces are perforated, vacuum-pipes connected with said hollow plungers, a vertically-movable plunger for compressing the fibers between the laterally-movable plungers, said vertically-movable plunger having openings in its face, and means for forcing air through said openings; substantially as described.

20. In a machine for forming pulp articles, the combination with laterally-movable plungers having perforated faces, means for sucking water through the perforations in the faces of said plungers, a vertically-movable plunger having openings in its face, and means for forcing air under pressure through said openings; substantially as described.

21. The herein-described method of forming pulp articles, which consists in initially shaping the article into cylindrical form by lateral pressure, confining the ends of the cylinder during such lateral pressure, and then subjecting the article to endwise pressure so as to reduce the length of said cylinder, said longitudinal pressure being exerted while the sides of the cylinder are in confinement; substantially as described.

22. The method of forming pulp articles which consists in initially shaping the pulp fibers by lateral pressure into cylindrical form, confining the ends of the cylinder during such lateral pressure, then subjecting the cylinder to longitudinal pressure while its sides are confined, and introducing air-pressure at one end of said cylinder to drive the water therefrom coincidently with subjecting the sides and opposite end of the cylinder to a sucking action to draw the water therefrom; substantially as described.

23. The method of forming pulp articles which consists in subjecting the pulp articles to lateral pressure and then subjecting the article thus initially formed to an endwise pressure and at the same time exhausting the air from the sides of the article being formed; substantially as described.

24. The method of forming pulp articles which consists in subjecting the pulp articles to lateral pressure, then subjecting the article thus initially formed to an endwise pressure and at the same time exhausting the air from the sides of the article being formed, and forcing air under pressure into the article at one end thereof; substantially as described.

25. The method of forming pulp articles which consists in subjecting the pulp articles to lateral pressure and then subjecting the article thus initially formed to an endwise pressure and at the same time exhausting the air from the sides and bottom of the article being formed, and then forcing air under pressure into the top of said article; substantially as described.

26. In a machine for forming pulp articles, the combination with lateral plungers and a vertically-movable plunger operating between said lateral plungers, of a sliding carrier upon which the pulp fibers are supported at the time they receive pressure, and means for moving said carrier so as to present an opening therein in line with the article being

BEST AVAILABLE COPY formed whereby said article is forced through said opening and carried away; substantially as described.

27. In a machine for forming pulp articles, the combination with lateral plungers, of a carrier having a perforated portion for supporting the pulp fibers at the time they are acted upon by the lateral plungers, a vertical plunger for initially subjecting said fibers to an endwise pressure, means for moving the carrier so as to place an opening therein in line with the vertical plunger, and means for continuing the downward movement of said vertical plunger to force the article into the opening of the carrier; substantially as described.

28. In a machine for forming pulp articles, the combination with lateral plungers, of a carrier having a perforated portion for supporting the pulp fibers at the time they are acted upon by the lateral plungers, a vertical plunger for initially subjecting said fibers to an endwise pressure, means for moving the carrier so as to place an opening therein in line with the vertical plunger, means for continuing the downward movement of said vertical plunger to force the article into the opening of the carrier, and means for continuing the movement of the carrier whereby the article is carried from under the vertical plunger and deposited at a predetermined point to one side of said plunger; substantially as described.

29. In a machine for forming pulp articles, the combination with mechanism for initially shaping the mass, said mechanism including a trough, a plunger operating in said trough to move the mass to one end of said trough and a carrier having a perforated box which forms the bottom wall of that end of the trough which receives the mass; substantially as described.

30. In a machine for forming pulp articles, the combination with mechanism for initially shaping the pulp mass, said mechanism including a trough, a plunger operating in said trough to move the mass to one end of said trough a carrier having a hollow box forming the end of said trough which receives said mass, and means whereby when said carrier is in its normal position the space beneath the perforated wall of said box is in communication with a vacuum-generating mechanism; substantially as described.

31. In a machine for forming pulp articles, the combination with a primary shaping mechanism, comprising a trough and a horizontally-movable plunger operating therein, of a carrier which forms the bottom of one end of said trough and upon which the article is primarily shaped, and means for moving said carrier whereby the article is transferred to a predetermined point; substantially as described.

32. In a machine for forming pulp articles, the combination with primary shaping mechanism, a transferring-carrier comprising a perforated box-like projection forming the bottom wall of said shaping mechanism when the carrier is home, said carrier being provided with an opening whereby when the carrier is actuated the pulp article is delivered into said opening, a continued movement of the carrier transferring said article to a predetermined point; substantially as described.

33. In a machine for forming pulp articles, the combination with a forming mechanism for initially shaping the mass of pulp, of a transferring device comprising a sliding member having an opening therein, and supporting-fingers around said opening; substantially as described.

34. In a machine for forming pulp articles, the combination with a forming mechanism for initially shaping the pulp mass, of a comb arranged beneath said forming mechanism, a transferring device having an opening into which the initially-shaped article is delivered after it has been acted upon by the said forming mechanism, the comb receiving said article, and means for actuating said actuating device so as to transfer the article from said comb to a predetermined point; substantially as described.

35. In a machine for forming pulp articles, the combination with a forming mechanism, of a transferring device coöperating therewith, the same comprising a slide having an opening therein, adjustable fingers on one side of said opening, movable fingers on the opposite side of said opening, and means for retracting said movable fingers as the slide approaches one extremity of movement; substantially as described.

36. In a machine for forming pulp articles, the combination with a forming mechanism for initially shaping the pulp into the form of a cylinder, said mechanism comprising laterally-movable plungers for giving the cylinder its shape, and a vertically-movable plunger for compressing the cylinder endwise, another forming mechanism for laterally compressing the cylinder, and a transferring device for delivering the pulp cylinder from the first to the second forming mechanism; substantially as described.

37. In a machine for forming pulp articles, the combination with a mechanism comprising a trough, laterally and vertically movable plungers for initially shaping the pulp mass, of a transferring mechanism for receiving the shaped article therefrom, and a second forming mechanism comprising a four-part die and a vertically-movable plunger to which the said article is delivered by said transferring device; substantially as described.

38. In a machine for forming pulp articles, the combination with a mechanism comprising a trough, laterally and vertically movable plungers for initially shaping the pulp mass, a second forming mechanism comprising a four-part die and a vertically-movable plunger for continuing the reducing action upon the pulp mass, a transferring device operating between said mechanisms, and means for actuating all of said parts in timed relation to each other; substantially as described.

39. In a machine for forming pulp articles, the combination with a stationary base, a slide operating across said base, die members arranged upon said base, and means for imparting angular motion to said die members; substantially as described.

40. In a machine for forming pulp articles, the combination with a stationary base provided with guiding-flanges, of a plurality of similarly-shaped die members, and a rotatable member connected to said die members for imparting movement thereto, which movement is tangential to the mold-cavity; substantially as described.

41. In a machine for forming pulp articles, the combination with a stationary base having angularly-arranged guiding-flanges, of die members slidingly mounted thereon and coöperating with said guiding-flanges, and a rotatable member connected to all of said die members for actuating them; substantially as described.

42. In a machine for forming pulp articles, the combination with a stationary base having angularly-arranged guiding-flanges, of die members having interengaging angular walls which, in the open position of the die, form part of the die-opening, said die-opening being in the shape of a square having rounded corners, said die members also engaging at their outer edges the angularly-arranged guiding-flanges, and means connected to all of said die members for moving them along their guiding-flanges at angles to each other, whereby in their closed position said die members form a circularly-shaped die-opening; substantially as described.

43. In a machine for forming pulp articles, the combination with a stationary base, a ring rotatably mounted thereon, pins or projec- 'ons carried by said ring, die members mov- ly mounted on said base and engaged by 1 pins said die members having equiangu- notion, and rectangular guide-flanges co- ting with said die members; substan- as described.

'n a machine for forming pulp articles, bination with equiangularly-movable ers, a slide having a perforated por- ng the bottom of the die-opening, lso having an opening designed to h the die-opening, and means for l slide; substantially as described.

chine for forming pulp articles, n with equiangularly-movable slide having a perforated por- bottom of the die-openin a plunger forming the top wall of the die-opening, and means for operating said plunger whereby it pauses while the die members are being moved; substantially as described.

46. In a machine for forming pulp articles, the combination with equiangularly-movable die members, a slide-plate having a perforated portion forming the bottom of the die-opening, a vertically-movable plunger designed to operate in the die-opening, mean for operating said plunger and causing it pause above the die-opening durin that the die members are be sleeve enveloping the low ger and forming a p the die-opening, a sp sleeve in position, and m sleeve; substantially as de 47. In a machine for formi the combination with equiang die members, a sliding plate ha rated portion forming the botto die-opening, a plunger operating opening, said sliding plate having designed to register with said d means for actuating said slidi means for causing said plunger article being formed from the through the opening in the slide stantially as described.

48. In a machine for formi the combination with a forr including a die having equiang members, a plunger coöpera die, and a conical die for recei as it is moved from the die-op first-mentioned die by said plun tially as described.

49. In a machine for forming pulp ar the combination with forming mechani cluding a die having equiangularly-m members for subjecting the article to l pressure, of a vertically-movable plunger operating in said die-opening to force the article therefrom after it has been laterally compressed, and a conically-shaped die in line with said plunger; substantially as described.

50. In a machine for forming pulp article the combination with an equiangularly-m able die, a hollow plunger operating i die, means for supplying air unde through said hollow plunger an ticle being treated, a hollow c which the article is pressed plunger, and means for g in said hollow plunger scribed.

51. In a mac the combina able die, wall o pla w

BEST AVAILABLE COP` said hollow plunger with air under pressure, whereby it is delivered onto the article being treated, a hollow post in line with said plunger, means for generating a vacuum in said hollow post, and a conical die coöperating with said hollow post and movable with relation thereto; substantially as described.

52. In a machine for forming pulp articles, the combination with a conical die and its ...ns of actuation, of a post arranged in said ...die, a plunger for delivering the ar... conical die, and an ejector de... the article from the top of ...onical die recedes; sub...

...forming pulp articles, ...h a reciprocating conical ...ry post arranged therein, a ...nger for forcing the mate... ...nical die and to said post, and ...g its striking-head designed to ...nished article from said post when ... and conical die recede; substan... ...scribed.

...achine for forming pulp articles, ...ion with a finishing-die having ...bottom wall, means for exhaust... ...d water from the space beneath ...wall, means for admitting a pres... ...space beneath said bottom wall ... is finished; substantially as ...

...ine for forming pulp articles, ... with a conical die, of a hol... ...ged therein, a hollow plunger ...aid conical die, and a valve for ...ssure through said hollow plun... ... of the article being formed and at ...e time exhausting pressure through ...llow post from under the said article, ...alve also admitting pressure through ...ost to eject the article when the plunger ...conical die recede; substantially as de... ...d.

... In a machine for forming pulp articles, the combination with mutilated pinions car...ing draining-buckets, of a toothed segment ...ternately engaging said pinions; substan...y as described.

... a machine for forming pulp articles, ...ation with draining-buckets, of ...rs connected thereto, a toothed ...means for rocking said toothed ...e direction and then in the ... dump said buckets; sub...

...ing pulp articles, ...g-bucket, of a ...me and con... ...om said ...ng to ...

of a hollow support therefor, said support conducting off the drained water, and a vent-pipe leading from said support at a point near the upper end thereof; substantially as described.

60. In a machine for forming pulp articles, the combination with draining-buckets, of mutilated gears connected thereto, a rocking toothed segment designed to alternately dump said buckets, and means for rocking said segment, said means comprising a vibrating lever having cam-faces, a movable switch-tongue coöperating with said cam-faces, and a traveling pin designed to pass alternately on opposite sides of said switch-tongue; substantially as described.

61. In a machine for forming pulp articles, the combination with draining-receptacles, a rocking segment designed to alternately dump said receptacles, and means for rocking said segment alternately in opposite directions, said means comprising a vibrating lever having cam-faces, a switch-tongue mounted between said cam-faces, and a disk having a projection designed to coöperate with said tongue and cam-faces; substantially as described.

62. In a machine for forming pulp articles, the combination with a suction-pipe for drawing off water from the article being formed, of a trap in the length of said pipe, and a floating valve in the bottom of said trap; substantially as described.

63. In a machine for forming pulp articles, the combination with a suction-pipe for drawing off water, a trap for receiving the water drawn through said suction-pipe, a floating valve in the bottom of said trap, and means for periodically admitting atmospheric air into said trap, whereby the hydrostatic pressure of the water opens said valve so as to permit the discharge of the water from the trap; substantially as described.

64. The herein-described method of making pulp stoppers or the like, the same consisting in first shaping the mass into cylindrical form by lateral pressure at the time that the ends of the cylinder are confined, so as to arrange the fibers in lines extending substantially longitudinally the stopper, and then subjectin the cylinder, while its sides are confined, endwise pressure to reduce the length ther and disturb the original arrangement of fibers; substantially as described.

65. The herein-described method of m... stoppers or the like, the same consis... first shaping the mass into cylindric... by lateral pressure at the time that... of the cylinder are confined, so as ... the fibers in lines extending subst... gitudinally the stopper, and the... the cylinder, while its sides ar... endwise pressure to reduce the ... and disturb the original arrar... fibers, and then subjecting th...

BEST AVAILABLE COP` eral pressure to reduce its diameter without disturbing its length; substantially as described.

66. The herein-described method of making stoppers or the like, the same consisting in first shaping the mass into cylindrical form by lateral pressure at the time that the ends of the cylinder are confined, so as to arrange the fibers in lines extending substantially longitudinally the stopper, then subjecting the cylinder, while its sides are confined, to endwise pressure to reduce the length thereof and disturb the original arrangement of the fibers, then subjecting the stopper to lateral pressure to reduce its diameter without disturbing its length, and subjecting said stopper, while under said endwise and lateral pressures, to the action of air-pressure delivered at one end of the cylinder to force the water out, and to air-suction at the opposite end of the cylinder to draw the water from the stopper; substantially as described.

67. The herein-described method of making pulp stoppers or the like, the same consisting in subjecting the drained mass of pulp to lateral pressure to initially shape the same into cylindrical form, during which time the ends of the cylinder are confined, then applying longitudinal pressure to reduce the length of the cylinder while its sides are confined so as to disturb the original position of the fibers, then again subjecting the cylindrical stopper to lateral pressure to reduce the diameter of the same, and finally forcing the stopper longitudinally into a tapered shape; substantially as described.

68. The herein-described method of making pulp stoppers or the like, the same consisting in subjecting the drained mass of pulp to lateral pressure to initially shape the same into cylindrical form, during which time the ends of the cylinder are confined, then applying longitudinal pressure to reduce the length of the cylinder while its sides are confined so as to disturb the original position of the fibers, then again subjecting the cylindrical stopper to lateral pressure to reduce the diameter of the same, and finally calendering the exterior surface of the stopper by longitudinally-applied pressure; substantially as described.

69. The herein-described method of making pulp stoppers or the like, the same consisting in draining a predetermined quantity of pulp-water having a predetermined amount of pulp fibers held in suspension therein, then subjecting the drained mass to lateral pressure to form the same into the shape of a cylinder, during which time the ends of the cylinder are confined, then applying longitudinal pressure, while the sides of the cylinder are confined, to reduce the length of the cylinder and disturb the fiber arrangment thereof, then subjecting the cylinder to lateral pressure to reduce the diameter thereof without disturbing its length, and finally forcing the cylinder longitudinally into a tapered die to give it shape and calender the exterior surface thereof; substantially as described.

70. The herein-described method of making pulp stoppers or the like, the same consisting in draining a predetermined amount of pulp-water of a density of about two grains of pulp per cubic inch of water, then subjecting the drained mass which has a density of about ten grains of pulp per cubic inch, to lateral pressure while its ends are confined to form a cylinder whose principal fibers lie parallel to the axis of said cylinder, said lateral pressure increasing the density to about forty grains per cubic inch, then subjecting the cylinder to an endwise pressure while its sides are confined which disturbs the arrangement of its fibers and increases the density to about fifty grains per cubic inch, then subjecting the stopper to lateral pressure to reduce its diameter and increase its density to about seventy grains per cubic inch, then forcing the stopper by longitudinal pressure into a tapered shape to calender its surface and further increase its density to about eighty grains per cubic inch; substantially as described.

In testimony whereof I hereunto affix my signature, in the presence of two witnesses, this 5th day of January, 1905.

RUDOLPH W. GOEB.

Witnesses:
F. R. CORNWALL,
GEORGE BAKEWELL.